(12) United States Patent
Ahmad et al.

(10) Patent No.: US 10,990,807 B2
(45) Date of Patent: Apr. 27, 2021

(54) SELECTING REPRESENTATIVE RECENT DIGITAL PORTRAITS AS COVER IMAGES

(71) Applicant: Adobe, Inc.

(72) Inventors: Tauqueer Ahmad, New Delhi (IN); Prateek Rajvanshi, New Delhi (IN); Damanjit Singh, New Delhi (IN)

(73) Assignee: ADOBE, INC., San Jose, CA (US)

( * ) Notice: Subject to any disclaimer, the term of this patent is extended or adjusted under 35 U.S.C. 154(b) by 94 days.

(21) Appl. No.: 16/563,554

(22) Filed: Sep. 6, 2019

(65) Prior Publication Data

US 2021/0073517 A1 Mar. 11, 2021

(51) Int. Cl.
*G06K 9/00* (2006.01)
*G06N 3/08* (2006.01)
*G06K 9/62* (2006.01)

(52) U.S. Cl.
CPC ..... *G06K 9/00281* (2013.01); *G06K 9/00248* (2013.01); *G06K 9/00275* (2013.01); *G06K 9/623* (2013.01); *G06N 3/08* (2013.01)

(58) Field of Classification Search
CPC ........... G06K 9/00281; G06K 9/00275; G06K 9/623; G06K 9/00248; G06N 3/08
See application file for complete search history.

(56) References Cited

U.S. PATENT DOCUMENTS

| | | | |
|---|---|---|---|
| 10,013,639 B1* | 7/2018 | Schurman | G06F 16/583 |
| 2006/0215014 A1* | 9/2006 | Cohen | G06K 9/00268 |
| | | | 348/14.08 |
| 2018/0046855 A1* | 2/2018 | Ganong | G06K 9/00248 |
| 2020/0097767 A1* | 3/2020 | Perry | G06K 9/00281 |
| 2020/0356646 A1* | 11/2020 | Fox | G06K 9/00248 |
| 2020/0356818 A1* | 11/2020 | Attorre | G06K 9/4628 |
| 2020/0387748 A1* | 12/2020 | Zhu | G06F 16/951 |
| 2021/0004587 A1* | 1/2021 | Xiong | G06K 9/4609 |

* cited by examiner

*Primary Examiner* — Nizar N Sivji
(74) *Attorney, Agent, or Firm* — Keller Jolley Preece

(57) ABSTRACT

The present disclosure relates to systems, methods, and non-transitory computer readable media for selecting representative recent cover images from collections of digital portraits by determining selection scores based on average face vectors. For example, the disclosed systems can generate an average face feature vector to represent a common appearance or facial expression of a user in the collection of digital portraits. The disclosed systems can further determine representativeness scores that indicate measures of closeness of digital portraits to the average face feature vectors. In addition, the digital portrait selection system can determine various other factors, such as recency scores, face area scores, and face expandability scores. Based on these factors, the digital portrait selection system can determine an overall selection score and select a digital portrait as a cover image.

20 Claims, 12 Drawing Sheets

SELECTING REPRESENTATIVE RECENT DIGITAL PORTRAITS AS COVER IMAGES

BACKGROUND

Often when someone attends an event or goes on a trip, they return with dozens or hundreds of digital images. Users are often eager to search through the images and select one as a profile picture for various social platforms or as a cover image for a digital folder of the digital images. To automate this process, some software and hardware platforms can analyze collections of digital images to group faces of like users together and then select cover photos from the collection automatically. Despite these advances however, conventional digital image systems continue to suffer from a number of disadvantages, particularly in their accuracy, efficiency, and flexibility selecting cover photos for users.

SUMMARY

One or more implementations described herein provide benefits and solve one or more problems in the art with systems, methods, and non-transitory computer readable media that can select cover images for users by identifying representative recent digital portraits. In particular, the disclosed systems can identify a collection of digital portraits that depict a face of a particular user and, from the collection of digital portraits, the disclosed systems can select a representative recent digital portrait as a cover image for the user. To identify a representative recent digital portrait, the disclosed systems can utilize both a representativeness factor and a recency factor. The disclosed systems can also dynamically determine cover images from digital portrait collections to ensure that representative cover images of users stay current. Thus, the disclosed systems can accurately determine cover images for users by identifying digital portraits that are both representative and recent.

Additional features and advantages of the present application will be set forth in the description which follows, and in part will be obvious from the description, or may be learned by the practice of such example implementations.

BRIEF DESCRIPTION OF THE DRAWINGS

This disclosure will describe one or more implementations of the invention with additional specificity and detail by referencing the accompanying figures. The following paragraphs briefly describe those figures, in which.

DETAILED DESCRIPTION

Figure 1:
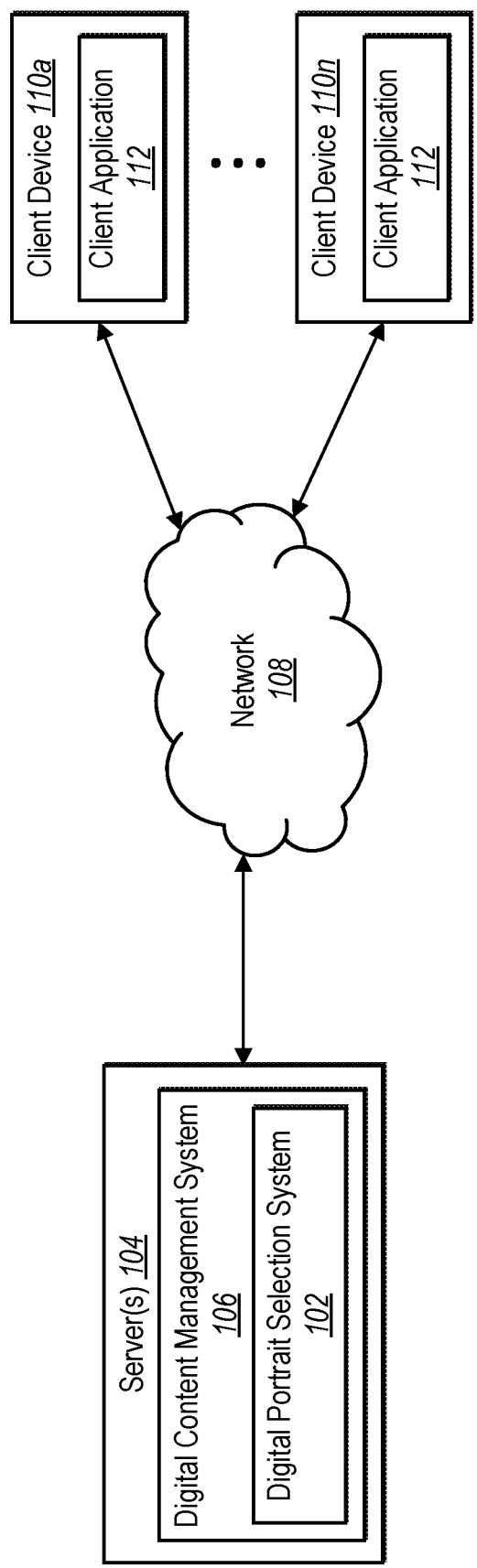
FIG. 1 illustrates an example environment for implementing a digital portrait selection system in accordance with one or more implementations.

One or more implementations described herein provide benefits and solve one or more of the foregoing or other problems in the art with a digital portrait selection system that can accurately and efficiently identify representative recent digital portraits to use as cover images for users. In particular, the digital portrait selection system can identify, from a collection of digital portraits depicting a face of user, a digital portrait to use as a cover image based on both a representativeness factor and a recency factor. Indeed, in one or more implementations, the digital portrait selection system can determine an overall selection score for a digital portrait based on generating a weighted combination of the representativeness factor and the recency factor. Thus, the digital portrait selection system can determine cover images for users by identifying digital portraits that are both representative and recent.

As mentioned, the digital portrait selection system can select a digital portrait to use as a cover image for a user. In particular, the digital portrait selection system can group or classify digital portraits by user based on faces depicted within the digital portraits. For example, the digital portrait selection system can utilize a clustering algorithm to generate user-specific clusters of digital portraits. Based on generating user-specific collections (e.g., clusters) of digital portraits, the digital portrait selection system can further determine cover images for the users by identifying digital portraits that are both representative of the respective users as well as recent. In some implementations, the digital portrait selection system determines selection scores for digital portraits based on one or more of representativeness scores, recency scores, face area scores, and/or face expandability scores.

As just mentioned, the digital portrait selection system can determine representativeness scores for digital portraits. The representativeness scores can indicate how representative a digital portrait is compared to other digital portraits in the collection. For example, the digital portrait selection system can determine a representativeness score for a digital portrait by generating a face feature vector for the digital portrait and comparing the face feature vector to an average face feature vector for the collection of digital portraits. Indeed, the digital portrait selection system can generate an average face feature vector that represents a combination of features of a collection of digital portraits of a given user. In addition, the digital portrait selection system can determine a representativeness score in the form of a measure of closeness of a respective face feature vector to the average face feature vector within a vector space. By determining a representativeness score, the digital portrait selection system can select digital portraits that are representative of a collection of digital portraits and avoid selecting outlier digital portraits. As an example, if a collection of digital portraits includes a majority of excited portraits (e.g., portraits depicted excited faces due, for example, to opening presents at a birthday), the use of a representativeness score can help ensure that the digital portrait selection system does not select a somber or un-excited portrait. Similarly, the use of a representativeness score can help ensure that the digital portrait selection system does not select a face of a person who is not the user but was misclassified as the user.

Additionally, the digital portrait selection system can determine recency scores for digital portraits. In particular, the digital portrait selection system can determine a recency score for a given digital portrait based at least in part on a date or a time when the digital portrait was captured. More specifically, the digital portrait selection system can sort a collection of digital portraits depicting a face of a user by capture date and can further determine a recency score based on the sorting of the digital portraits. The use of representativeness score can help ensure that the digital portrait selection system does not select an outdated digital portrait. For example, in a collection of digital portraits that is consistently receiving new digital portraits, the use of representativeness score can help ensure that the digital portrait selection system maintains a recent digital portrait as the cover image.

In some implementations, the digital portrait selection system determines face area scores for digital portraits. More particularly, the digital portrait selection system can determine a face area score for a digital portrait by determining dimensions of a face depicted within the digital portrait. Indeed, the digital portrait selection system can identify a portion of a digital portrait taken up by a face and can determine an area that is covered by the face within the digital portrait. Thus, in these or other implementations, the digital portrait selection system determines a face area score based on an area of a face within a digital portrait. The face area score can bias the digital portrait selection system to select a digital portrait with a face covering a larger area of the digital portrait. The use of the face area score can help ensure that the digital portrait selection system does not select a digital portrait with a small depiction of the user's face.

In one or more implementations, the digital portrait selection system determines face expandability scores for digital portraits. In particular, the digital portrait selection system can determine a face expandability score for a digital portrait by determining an area around a face depicted within the digital portrait (e.g., a background area). To elaborate, the digital portrait selection system can determine an amount (e.g., a distance) that a face can be expanded within a digital portrait before contacting or exceeding a boundary of the digital portrait. In some implementations, the digital portrait selection system determines a face expandability score based on different amounts of background space available to expand the face in various directions—e.g., expandability directions such as a left expansion distance, a right expansion distance, a top expansion distance, and/or a bottom expansion distance. The face expandability score can bias the digital portrait selection system to select a digital portrait with a face that is not partially cut off by a border of the image or that is an overly close up image. The use of the face expandability score can help ensure that the digital portrait selection system selects a digital portrait of an appropriate size and positioning.

As mentioned, the digital portrait selection system can determine selection scores for digital portraits. In particular, the digital portrait selection system can determine a selection score for a given digital portrait by generating a weighted combination of sub-factors such as a representativeness score, a recency score, a face area score, and/or a face expandability score. For example, the digital portrait selection system can determine a representativeness weight to apply to a representativeness score, a recency weight to apply to a recency score, a face area weight to apply to a face area score, and a face expandability weight to apply to a face expandability score. Thus, the digital portrait selection system can select a digital portrait as a cover image for a user based on a selection score that is a weighted combination of the representativeness score, the recency score, the face area score, and/or the face expandability score.

As mentioned above, conventional digital image systems are often inaccurate when selecting cover photos for users. In particular, conventional systems often select non-representative digital images as cover photos for users. For example, many conventional systems analyze collections of digital images that depict particular users to select cover photos based on visually appealability of the digital images. Indeed, these conventional systems typically select cover photos based on identifying digital images where users are smiling, not wearing glasses, and/or looking directly at the camera. However, because of their emphasis on aesthetic factors, these systems are often prone to select outlier digital images as cover photos that are not representative of users and how they generally appear in the majority of the digital images in the collection.

Additionally, conventional digital image systems are often inefficient. More specifically, many conventional systems typically require excessive time to process user interactions required to update digital image collections for identifying cover photos. For example, some conventional systems can require users to manually navigate through multiple user interfaces and/or applications to select cover photos from digital images from recent trips or events. Indeed, these systems often require users to navigate through multiple layers of user interfaces to access desired functionality of selecting cover photos for users within new digital images. Due to the onerous nature of manually adding digital and manually selecting cover photos, these conventional systems are inefficient.

Conventional digital image systems are also typically inflexible. Particularly, many conventional systems select cover photos for users based on a static analysis of a fixed set of digital images. As a result of their static selection of cover photos, these conventional systems frequently select cover photos for users that become outdated and no longer representative of users.

The digital portrait selection system provides several advantages over conventional digital image systems. For example, the digital portrait selection system can improve accuracy over conventional systems. By determining representativeness scores for digital images, the digital portrait selection system can accurately select cover images for users that are more representative of user appearance in the collection of digital images. Indeed, because the digital portrait selection system can generate an average face feature vector for a user to use as a basis for selecting a cover image, the digital portrait selection system can effectively discard outlier digital portraits and can select more representative digital portraits as cover images. This is in contrast to conventional systems that may select outlier digital images that may be visually appealing but are not representative.

In addition, the digital portrait selection system can improve efficiency over conventional digital image systems. For example, the digital portrait selection system can reduce or eliminate the manual effort needed in many conventional systems for users to search through collections of digital images to determine cover images for users depicted within the digital images. Indeed, the digital portrait selection system can automatically determine cover images for users based on detecting new digital portraits added to a collection, thereby reducing the number of user interactions required to generate cover images as compared to conventional systems. As a result, the digital portrait selection system can reduce the computer resources (e.g., computing time and computing power) required to process such user interactions, thus improving efficiency over conventional systems.

Further, the digital portrait selection system can improve flexibility over conventional digital image systems. For example, rather than the analysis of static collections of digital images performed by conventional systems that rigidly maintain cover images that become outdated, the digital portrait selection system can dynamically update and determine cover images based at least in part on recency. Additionally, by updating or re-generating an average face feature vector based on the addition of new digital portraits, the digital portrait selection system can stay up-to-date with a most representative appearance of a user to use as a basis for selecting a cover image. Thus, the digital portrait selection system can flexibly adapt, update, or change cover photos to maintain current and representative cover photos of users.

As illustrated by the foregoing discussion, the present disclosure utilizes a variety of terms to describe features and benefits of the digital portrait selection system. Additional detail is hereafter provided regarding the meaning of these terms as used in this disclosure. In particular, the term "digital portrait" refers to a digital image that depicts all or part of a face of one or more users. A digital portrait can include a depiction of a face in addition to shoulders or other portions of a user. In some implementations, a digital portrait can include a background portion in addition to (e.g., around) a depicted face. Thus, a digital portrait can comprise a "selfie," a close up of a user's face, or landscape picture with a user standing in the foreground.

As mentioned, the digital portrait selection system can generate face feature vectors for digital portraits by utilizing a face feature model. As used herein, the term "face feature model" refers to a machine learning model (e.g., a neural network) that learns and/or extracts features of digital images. In particular, a face feature model can analyze a digital portrait to determine features and generate a face feature vector. In some implementations, the face feature model comprises a neural network, as described in U.S. Pat. No. 9,613,058, the entire contents of which are hereby incorporated by reference.

Relatedly, the term "feature" or "feature value" refers to a digital encoding of one or more characteristics (e.g., a visual characteristic or an unobservable deep feature characteristic) of input data (e.g., a digital image). The term feature includes latent or hidden features utilized by a neural network (e.g., a face feature model) to generate a prediction (e.g., one or more vectors that are not decipherable or comprehensible by humans). For example, a feature can include a digital representation of a characteristic (observable or not) of a digital portrait. In addition, the term "feature vector" refers to a vector of one or more features. For example, a face feature vector can include features that represent a digital portrait.

As also mentioned, the digital portrait selection system can generate an average face feature vector for a user. As used herein, the term "average face feature vector" (or "average face vector") refers to a face feature vector that represents an amalgamation or combination of features from digital portraits of a user. For example, an average face feature vector can correspond to an average or most common appearance, facial expression, or look of a user's face within a collection of digital portraits. In some implementations, an average face feature vector can include one or more features that are combinations (e.g., averages) of corresponding features of face feature vectors generated from digital portraits within the collection of digital portraits.

As further mentioned, the digital portrait selection system can also determine representativeness scores for digital portraits in relation to an average face feature vector. As used herein, the term "representativeness score" refers to a measure of closeness of a digital portrait to an average face feature vector. For example, a representativeness score can indicate a distance of a face feature vector (corresponding to a digital portrait) to an average face feature vector (e.g., within a vector space). In some implementations, a representativeness score can include a measure of visual similarity or likeness of a respective digital portrait to an average or most common appearance, facial expression, or look of a user's face within a collection of digital portraits.

In addition to generating representativeness scores, the digital portrait selection system can also generate recency scores. As used herein, the term "recency score" refers to a measure of recency of a digital portrait. In particular, a recency score can be based at least in part on a date and/or time when a digital portrait was captured. In some implementations, a recency score can include an index assigned to a digital portrait based on a comparison, sequence, or order of capture dates associated with a collection of digital portraits depicting faces of a user.

In some implementations, the digital portrait selection system can generate face area scores for digital portraits. As used herein, the term "face area score" refers to a score that indicates or corresponds to an area of a digital portrait occupied by a face depicted within the digital portrait. For example, a face area score can include an area (e.g., a normalized area) of a rectangle that circumscribes a depicted face. In some implementations, a face area score includes a proportion or percentage of a digital portrait that is occupied by a rectangle that circumscribes a depicted face.

Additionally (or alternatively), the digital portrait selection system can generate face expandability scores. As used herein the term "face expandability score" refers to a score or measure of an amount of expandable space available around a face depicted within a digital portrait. Indeed, a face expandability score can indicate a background space available within a digital portrait around a depicted face (e.g., around a rectangle circumscribing a depicted face) that is available for expanding the depicted face to reach one or more boundaries of the digital portrait. For example, a face expandability score can include a combination (or a minimum) of one or more expansion distances such as a right expansion distance (a distance from a rightmost position of a depicted face to a right boundary of the digital portrait), a left expansion distance (a distance from a leftmost position of a depicted face to a left boundary of the digital portrait), a top expansion distance (a distance from a topmost position of a depicted face to a top boundary of the digital portrait), and a bottom expansions distance (a distance from a bottommost position of a depicted face to a bottom boundary of the digital portrait). In some implementations, an expansion distance can be measured in pixels.

Based on the representativeness scores, the recency scores, the face area scores, and/or the face expandability scores, the digital portrait selection system can generate selection scores for digital portraits. As used herein, the term "selection score" refers to a score indicating (or corresponding to) a probability of selecting a digital portrait as a cover image for a user. For example, a selection score can include a combination (e.g., a weighted combination) of one or more of the representativeness score, the recency score, the face area score, and/or the face expandability score. Relatedly, the term "cover image" refers to a digital portrait indicating or representing a user. For example, a cover image can include a profile picture, a thumbnail image, a user account image, or some other representative digital image of a user.

Additional detail regarding the digital portrait selection system will now be provided with reference to the figures. For example, FIG. 1 illustrates a schematic diagram of an example computing system environment for implementing a digital portrait selection system 102 in accordance with one or more implementations. An overview of the digital portrait selection system 102 is described in relation to FIG. 1. Thereafter, a more detailed description of the components and processes of the digital portrait selection system 102 is provided in relation to the subsequent figures.

As shown in FIG. 1, the environment includes server(s) 104, client devices 110a-110n, and a network 108. Each of the components of the environment can communicate via the network 108, and the network 108 may be any suitable network over which computing devices can communicate. Example networks are discussed in more detail below in relation to FIG. 12.

As mentioned, the environment includes client devices 110a-110n. In particular, the client devices 110a-110n can be one of a variety of computing devices, including a smartphone, a tablet, a smart a television, a desktop computer, a laptop computer, a virtual reality device, an augmented reality device, or some other computing device as described in relation to FIG. 12. The client devices 110a-110n can provide or display one or more user interfaces for viewing, selecting, manipulating, or editing digital portraits via the client application 112. The client devices 110a-110n can also receive user input from a user in the form of clicks, keyboard inputs, touchscreen inputs, etc. to perform various functions within, or apart from, the client application 112. In some implementations, the client devices 110a-110n facilitate selection and/or display of cover images for users whose faces are depicted within a collection of digital portraits.

Particularly, the client devices 110a-110n include a client application 112 whereby a user can view or edit digital portraits associated with one or more users. The client application 112 may be a web application, a native application installed on the client devices 110a-110n (e.g., a mobile application, a desktop application, etc.), or a cloud-based application where all or part of the functionality is performed by the server(s) 104. The client application 112 can present or display information to a user, such as a collection of digital portraits and one or more cover image for corresponding users whose faces are depicted within the collection of digital portraits. The client application 112 can also include a selectable option to generate a cover image for a particular user.

As illustrated in FIG. 1, the environment includes the server(s) 104. The server(s) 104 may generate, store, process, receive, and transmit electronic data, such as digital portraits and cover images. For example, the server(s) 104 can transmit data to the client devices 110a-110n to provide a user interface including digital portraits and/or cover images for display via the client application 112. The server(s) 104 may identify (e.g., monitor and/or receive) data from the client devices 110a-110n in the form of an input to generate a cover image for a user. In some implementations, the server(s) 104 comprises a digital content server. The server(s) 104 can also (or alternatively) comprise an application server, a communication server, a web-hosting server, a social networking server, a digital content campaign server, or a digital communication management server.

As shown in FIG. 1, the server(s) 104 can also include the digital portrait selection system 102 (e.g., implemented as part of a digital content management system 106). Although FIG. 1 depicts the digital portrait selection system 102 located on the server(s) 104, in some implementations, the digital portrait selection system 102 may be implemented by (e.g., located entirely or in part) on one or more other components of the environment. For example, the digital portrait selection system 102 may be implemented by a client device 110a, and/or a third-party device.

In some implementations, the environment may have a different arrangement of components and/or may have a different number or set of components altogether. For example, environment can include a database for storing information such as digital portraits. The database can be housed by the server(s) 104, the client devices 110a-110n, and/or separately by a third party in communication via the network 108. In addition, the client devices 110a-110n may communicate directly with the digital portrait selection system 102, bypassing the network 108.

Figure 2:
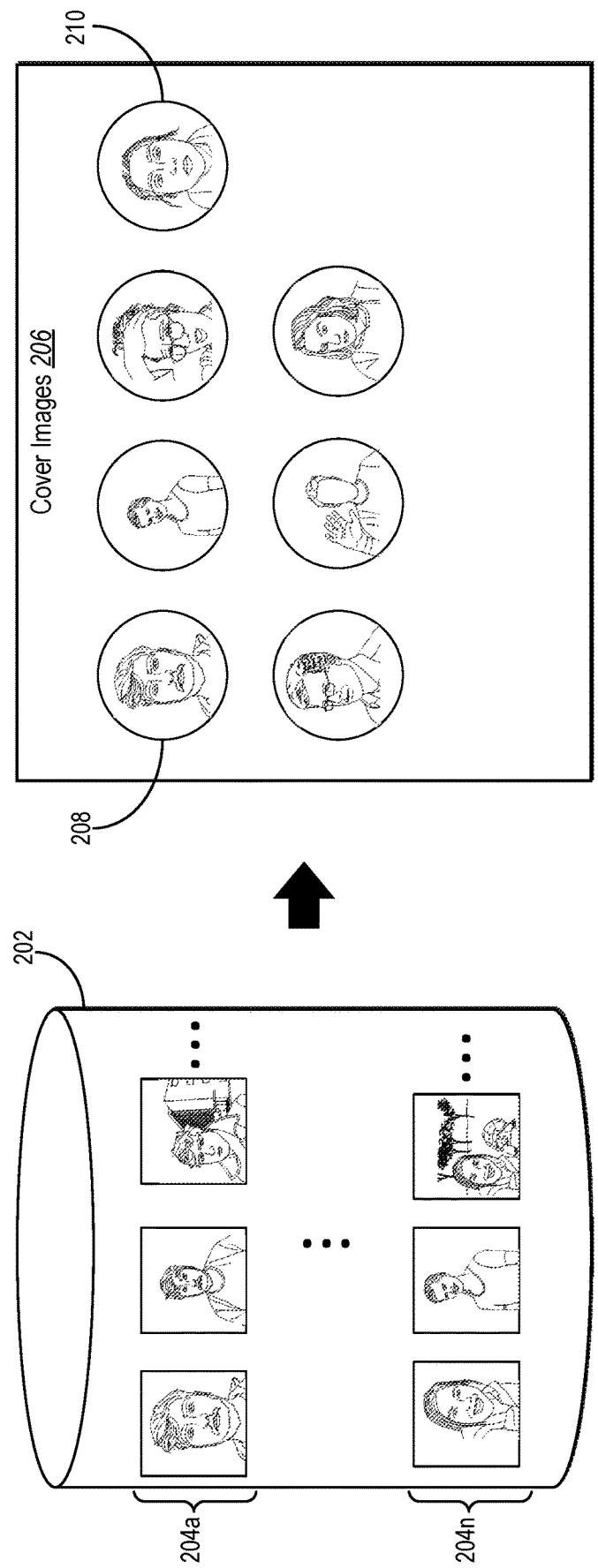
FIG. 2 illustrates an overview of a process of selecting cover images for users based on digital portrait collections of the users in accordance with one or more implementations.

As mentioned, the digital portrait selection system 102 can generate or determine cover images for users based on analyzing digital portraits. FIG. 2 illustrates a representation of an example database 202 that includes user-specific collections of digital portraits 204a-204n. The digital portrait selection system 102 can identify cover images 206, such as the cover image 208 and the cover image 210, from the collection of digital portraits 204a-204n, in accordance with one or more implementations. The digital portrait selection system 102 can analyze digital portraits to identify and categorize the digital portraits into collections or classes that correspond to specific users. Indeed, the digital portrait selection system 102 analyzes the digital portraits to generate the digital portrait collection 204a that includes digital portraits that depict faces of a particular user. Likewise, the digital portrait selection system 102 generates the digital portrait collection 204n of digital portraits that depict faces of a different user. Thus, the digital portrait selection system 102 separates and categorizes digital portraits to groups of digital portraits depicting faces of the same user together. It will be appreciated that a digital portrait can portray multiple users, and as such, can be included in multiple groups of digital portraits.

In one or more implementations, the digital portrait selection system 102 can generate a face feature vector for each face portrayed in a digital portrait using the face feature model described below. The digital portrait selection system 102 can then cluster the face feature vectors using K-means or another technique. Each cluster can form a group for a given user. In still further implementations, the digital portrait selection system 102 utilize the facial recognition system described in U.S. Pat. No. 8,503,739, the entire contents of which are hereby incorporated by reference.

Based on generating the digital portrait collections 204a-204n, the digital portrait selection system can further determine or identify the cover images 206. In particular, the digital portrait selection system 102 analyzes the digital portrait collection 204a to select the cover image 208 from the digital portrait collection 204a. In a similar fashion, the digital portrait selection system 102 analyzes the digital portrait collection 204n to select the cover image 210 from the digital portrait collection 204n. To select the cover images 206, the digital portrait selection system 102 utilizes a face feature model and identifies digital portraits that are both visually representative (e.g., closely resemble a most common look or appearance) of respective users and recent to select as the cover images 206 from respective digital portrait collections 204a-204n.

Figure 3:
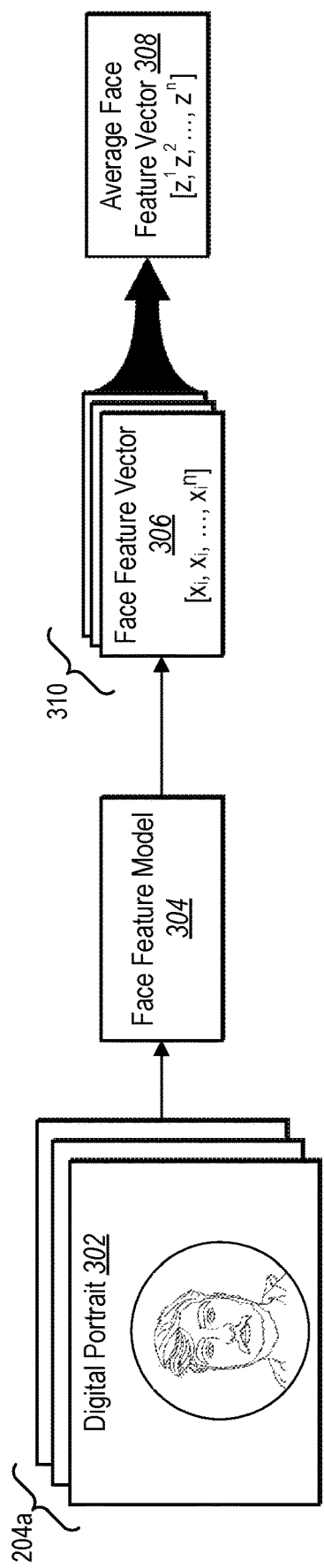
FIG. 3 illustrates an overview of a process of generating an average face feature vector in accordance with one or more implementations.

As mentioned, the digital portrait selection system 102 can utilize a face feature model to generate face feature vectors for digital portraits to use as a basis for comparing digital portraits against an average face feature vector. For example, FIG. 3 illustrates an example flow of how the digital portrait selection system 102 generates face feature vectors for digital portraits. Indeed, the digital portrait selection system 102 generates face feature vectors that include features that correspond to or represent a digital image that depicts a face. The digital portrait selection system 102 further generates an average face feature vector for a particular user or face based on the face feature vectors of digital portrait collection 204a.

FIG. 3 further illustrates an example flow of how the digital portrait selection system 102 generates an average face feature vector 308 in accordance with one or more implementations. As illustrated, the digital portrait selection system 102 analyzes the digital portrait collection 204a to generate an average face feature vector 308 based on a number of face feature vectors that correspond to individual digital portraits within the digital portrait collection 204a. Thus, the average face feature vector 308 represents a combination or amalgamation of features across the digital portrait collection 204a.

As illustrated in FIG. 3, the digital portrait selection system 102 utilizes a face feature model 304 to analyze a digital portrait 302 (e.g., a digital portrait from the digital portrait collection 204a). In particular, the digital portrait selection system 102 analyzes the digital portrait 302 utilizing the face feature model 304. For instance, the digital portrait selection system 102 utilizes the face feature model 304 to extract features (e.g., deep features) from the digital portrait 302 to generate the face feature vector 306. Indeed, the digital portrait selection system 102 generates the face feature vector for the $i^{th}$ digital portrait (e.g., the digital portrait 302) within the digital portrait collection 204a having the form:

$$fv_i = [x_i^1, x_i^2, \ldots x_i^n]$$

where $fv_i$ represents the $i^{th}$ face feature vector (e.g., the face feature vector 306), x represents a feature or feature value within the face feature vector, and n represents the number of features or the length of the face feature vector.

Thus, by utilizing the face feature model 304 for the digital portrait 302 as well as the other digital portraits within the digital portrait collection 204a, the digital portrait selection system 102 generates a set of face feature vectors 310 (including the face feature vector 306) corresponding to the digital portrait collection 204a. For example, the digital portrait selection system 102 generates a set of m face feature vectors form digital portraits within the digital portrait collection 204a.

More specifically, in some implementations, the face feature model 304 comprises a neural network, as described in U.S. Pat. No. 9,613,058, the entire contents of which is hereby incorporated by reference. For example, the face feature model 304 can comprise a set of convolutional layers that encode images (or image patches) into feature vectors. Because of their function, the convolutional layers are collectively called an encoder. In one or more implementations, the encoder of the neural network can comprise five convolution layers. In any event, the digital portrait selection system 102 can extract a face feature vector 306 from each digital portrait utilizing a neural network.

As shown, the digital portrait selection system 102 can also generate the average face feature vector 308 based on the set of m face feature vectors. More specifically, the digital portrait selection system 102 combines features of the face feature vector 306 and the other face feature vectors 310 to generate the average face feature vector 308 that represents or corresponds to an average (or most common) look or appearance of a user within the digital portrait collection 204a. For example, the digital portrait selection system 102 generates the average face feature vector 308 given by:

$$afv = \left[ \left( \sum_{i=1}^{m} x_i^1 \right) \Big/ m, \left( \sum_{i=1}^{m} x_i^2 \right) \Big/ m, \ldots, \left( \sum_{i=1}^{m} x_i^n \right) \Big/ m \right]$$

where afv represents the average face feature vector 308 and m represents the number of digital portraits (e.g., within the digital portrait collection 204a). In other words, the digital portrait selection system 102 can sum all of the feature values for a first feature $x^1$ from the set of face feature vectors and divide the sum by the number of face feature vectors m to generate and average feature value $z^1$. The digital portrait selection system 102 can repeat this process for all of the features in the face feature vectors 310. As such, the above algorithm can also be expressed as:

$$afv = [z^1, z^2, \ldots, z^n]$$

where z represents an average feature value from all of the face feature vectors.

In one or more implementations, the digital portrait selection system 102 re-generates the average face feature vector 308 based on changes to the digital portrait collection 204a. For instance, the digital portrait selection system 102 detects an upload of a new digital image and analyzes the digital image to determine whether to add the digital image to the digital portrait collection 204a (e.g., based on determining whether the same user's face is depicted). Based on determining that the new digital image is a digital portrait that belongs to the digital portrait collection 204a, the digital portrait selection system 102 modifies the digital portrait collection 204a to add the new digital portrait. Further, the digital portrait selection system 102 updates or re-generates the average face feature vector 308 by utilizing the face feature model 304 to generate a new face feature vector for the new digital portrait. The digital portrait selection system 102 then adds the new face feature vector to the set of feature face vectors 310. The digital portrait selection system 102 the re-determines average feature values across the entire set of feature vectors 310 as described above to generate an updated average face feature vector. Thus, the digital portrait selection system 102 maintains accurate, up-to-date average face feature vectors to use as basis for identifying representative digital portraits to select as cover images.

Figure 4:
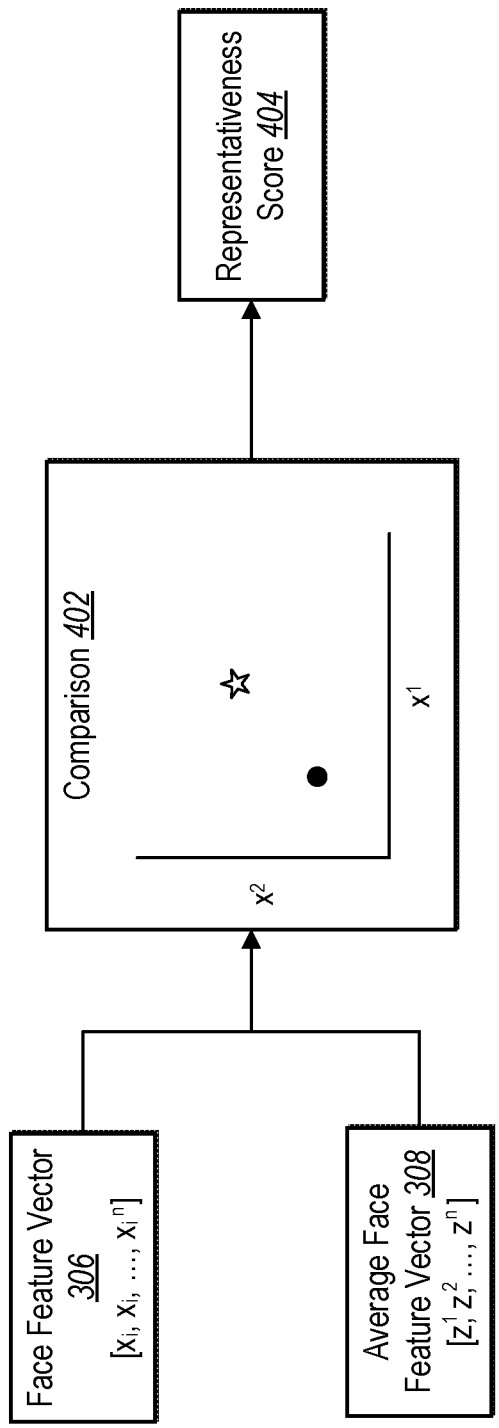
FIG. 4 illustrates an overview of a process of generating a representativeness score for a digital portrait in accordance with one or more implementations.

As mentioned, the digital portrait selection system 102 can determine representativeness scores for a digital portrait to determine a measure of closeness of the digital portrait to an average face feature vector. In particular, the digital portrait selection system 102 can determine representativeness scores to determine a measure of how representative digital portraits are of a majority, average, or most common appearance of a user's face. For example, FIG. 4 illustrates a comparison 402 of the face feature vector 306 (which corresponds to the digital portrait 302) with the average face feature vector 308 to generate the representativeness score 404 in accordance with one or more implementations. By performing the comparison 402, the digital portrait selection system 102 can determine a measure of closeness of the digital portrait 302 to resembling an average or a most common appearance of the depicted user from the digital portraits in the collection 204a.

As illustrated in FIG. 4, the digital portrait selection system 102 performs the comparison 402 to determine a measure of closeness between the face feature vector 306 and the average face feature vector 308. In some implementations, the digital portrait selection system 102 performs the comparison 402 by determining a distance between the face feature vector 306 and the average face feature vector 308 within a vector space. As shown, the digital portrait selection system 102 determines distance between the face feature vector 306 (indicated by the black dot within the vector space) and the average face feature vector (indicated by the star shape within the vector space). While the vector space shown in FIG. 4 is two-dimensional, this is merely for ease of illustration. Indeed, the vector space can have a dimensionality equal to the number of features within the face feature vector 306 and/or the average face feature vector 308 (e.g., n dimensions). Thus, digital portrait selection system 102 can determine distances between the face feature vector 306 and the average face feature vector 308 based on the feature values within the respective vectors having dimensionalities equal to the number of feature values.

By determining the distance between the face feature vector 306 and the average face feature vector 308, the digital portrait selection system 102 determines the representativeness score 404. In some implementations, the digital portrait selection system 102 determines the representativeness score 404 by determining a cosine similarity between the face feature vector 306 and the average face feature vector 308, as given by:

$$\text{representativeness score}(fv_i) = \text{cosine\_similarity}(fv_i, afv)$$

where $$\text{cosine\_similarity}(x, y) = \frac{x \cdot y}{\|x\| \cdot \|y\|}$$

thus $$\text{representativeness score}(fv_i) = \frac{fv_i \cdot afv}{\|fv_i\| \cdot \|afv\|}.$$

Based on determining the representativeness score 404 and further determining representativeness scores for other digital portraits (e.g., digital portraits within the digital portrait collection 204a), the digital portrait selection system 102 can eliminate, remove, or reduce the number of outlier digital portraits from being selected as a cover photo. More specifically, the digital portrait selection system 102 can narrow the pool of candidate digital portraits from which to select a cover image by removing or filtering out those digital portraits whose representativeness scores fail to satisfy a threshold similarity.

In some implementations, the digital portrait selection system 102 filters out digital portraits whose feature vectors are too distant from the average face feature vector 308 within a vector space. For instance, the digital portrait selection system 102 determines a threshold similarity in the form of a threshold distance in vector space, and the digital portrait selection system 102 removes from consideration those digital portraits whose feature vectors are beyond the threshold vector space distance. By so doing, the digital portrait selection system 102 removes those digital portraits that less resemble an average or most common appearance of a user.

In these or other implementations, the digital portrait selection system 102 ranks or sorts digital portraits within the digital portrait collection 204a. For instance, the digital portrait selection system 102 ranks the digital portraits based on respective representativeness scores. In some implementations, the digital portrait selection system 102 selects the top-ranked digital portrait (e.g., the digital portrait with the smallest distance or highest representativeness score) as a cover image for a user.

In these or other implementations, the digital portrait selection system 102 re-determines the representativeness score 404 based on detecting changes or modifications to the average face feature vector 308. Indeed, as mentioned, the digital portrait selection system 102 can modify the average face feature vector 308 in response to new digital portraits being added, and the digital portrait selection system 102 can likewise update the representativeness score 404 to maintain accurate, up-to-date measures of closeness with respect to a most common appearance of a depicted user.

Figure 5:
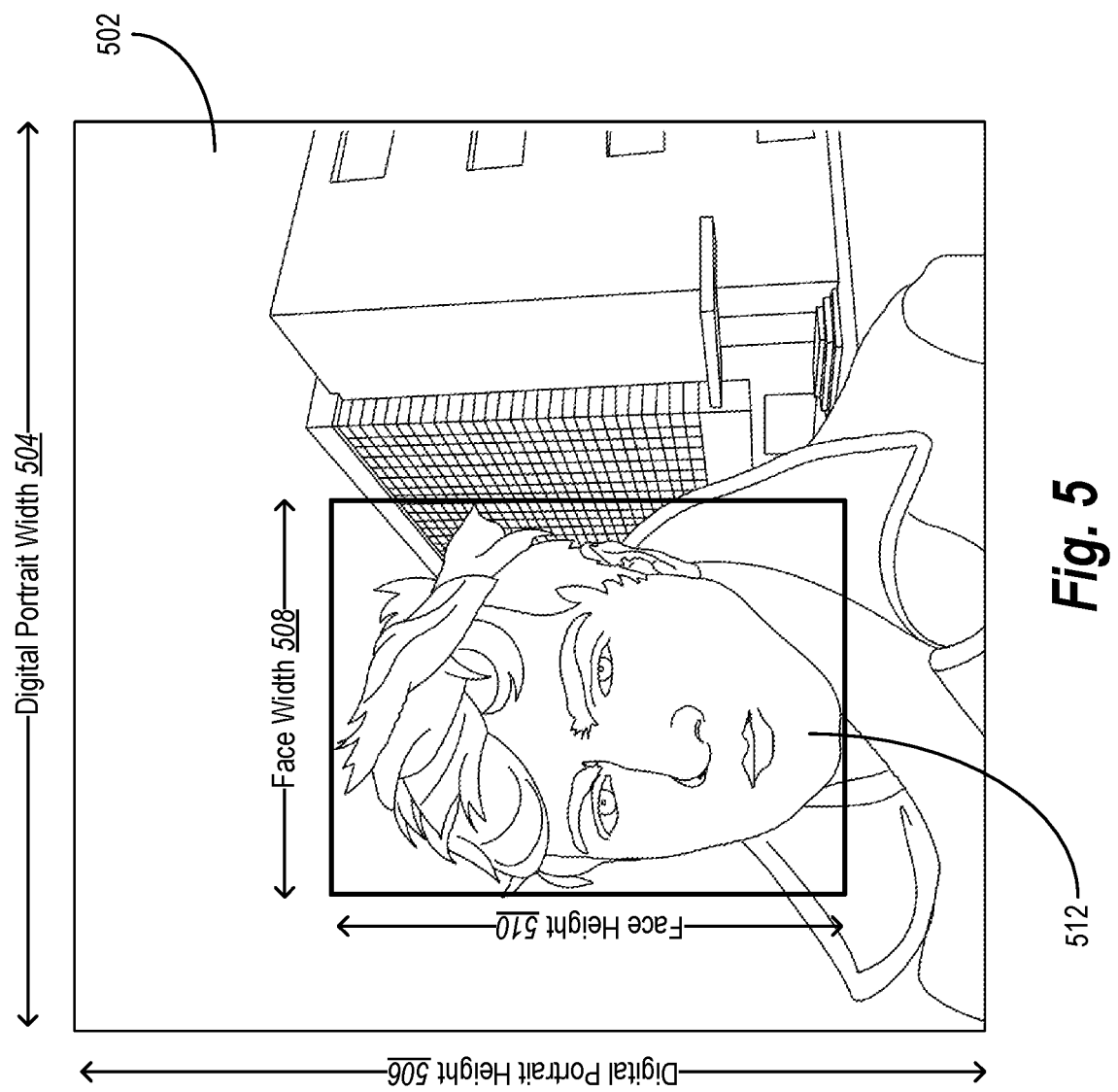
FIG. 5 illustrates an overview of a process of a face area score for a digital portrait in accordance with one or more implementations.

As mentioned, the digital portrait selection system 102 can generate or determine face area scores for digital portraits. In particular, the digital portrait selection system 102 can determine face area scores to help ensure that selected cover images include a desired face size and/or an appropriate proportion of face size to background area. For example, FIG. 5 illustrates a digital portrait 502 depicting a face 512 for which the digital portrait selection system 102 determines a face area score in accordance with one or more implementations. As shown, the digital portrait selection system 102 detects or identifies the face 512 depicted within the digital portrait 502. For example, the digital portrait selection system 102 can utilize a face detection algorithm to locate the face 512 in the digital portrait 502. In some implementations, identifying the face 512 can involve identifying eyes, a nose, a mouth, hair, one or more ears, a hat, glasses, or some other visual element related to a user's face or head. Still further the identifying the face 512 can involve identifying a bounding box surrounding the face 512 as shown in FIG. 5.

Based on identifying the face 512, the digital portrait selection system 102 determines dimensions of the face 512. For example, the digital portrait selection system 102 determines a face width 508 and a face height 510. Indeed, the digital portrait selection system 102 determines a face width 508 and a face height 510 by generating a rectangle (or some other polygon) to circumscribe the face 512 by extending vertically to touch (or extend just beyond) a topmost portion of the face 512 (which may be the top of the forehead or may otherwise include hair or a hat for instance). In still other implementations, the digital portrait selection system 102 measures the dimension of the bounding box generated as part of detecting the face 512

In some implementations, the digital portrait selection system 102 determines a normalized face width and a normalized face height. In particular, the digital portrait selection system 102 determines a normalized face width by comparing the face width 508 with a digital portrait width 504. For instance, the digital portrait selection system 102 determines a ratio between the face width 508 and the digital portrait width 504. In some implementations, the digital portrait selection system 102 determines a normalized face width according to:

$$nfw = \frac{\text{face width}}{\text{digital portrait width}}$$

where nfw represents the normalized face width.

Additionally, the digital portrait selection system 102 determines a normalized face height by comparing the face height 510 with a digital portrait height 506. For example, the digital portrait selection system 102 determines a ratio between the face height 510 and the digital portrait height 506. In some implementations, the digital portrait selection system 102 determines a normalized face height according to:

$$nfh = \frac{\text{face height}}{\text{digital portrait height}}$$

where nfh represents the normalized face height.

In these or other implementations, the digital portrait selection system 102 determines a face area score for the digital portrait 502 based on the normalized face width and the normalized face height. For instance, the digital portrait selection system 102 determines a face area score by combining the normalized face width and the normalized face height. In some implementations, the digital portrait selection system 102 determines a face area score according to:

face area score=round($nfw*nfh$,3)

where
round(number, precision)=number with a decimal precision such that the face area score is given by the product of the normalized face width with the normalized face height to a precision of three decimal places.

Based on determining the face area score for the digital portrait 502 as well as for other digital portraits within a given digital portrait collection (e.g., the digital portrait collection 204a) depicting a particular user, the digital portrait selection system 102 further removes or filters out (e.g., removes from consideration for selection as a cover image) those digital portraits that fail to satisfy a threshold face area score. For example, the digital portrait selection system 102 filters out those digital portraits that depict faces that occupy or take up less than a threshold portion, percentage, or proportion of a digital portrait. Indeed, the digital portrait selection system 102 determines that digital portraits depicting faces that cover up a larger portion of the digital portrait are more eligible or more likely candidates for a cover image.

In some implementations, the digital portrait selection system 102 ranks digital portraits based on face area scores. For example, the digital portrait selection system 102 ranks digital portraits according to which digital portraits depict faces that take up larger percentages of their respective digital portraits. In some implementations, the digital portrait selection system 102 selects a top-ranked digital portrait with a highest face area score as a cover image. However, the digital portrait selection system 102 also avoids selecting as cover images closeup digital portraits where a depicted face takes up too much space of a digital portrait. To that end, the digital portrait selection system 102 utilizes a face expandability score.

Figure 6:
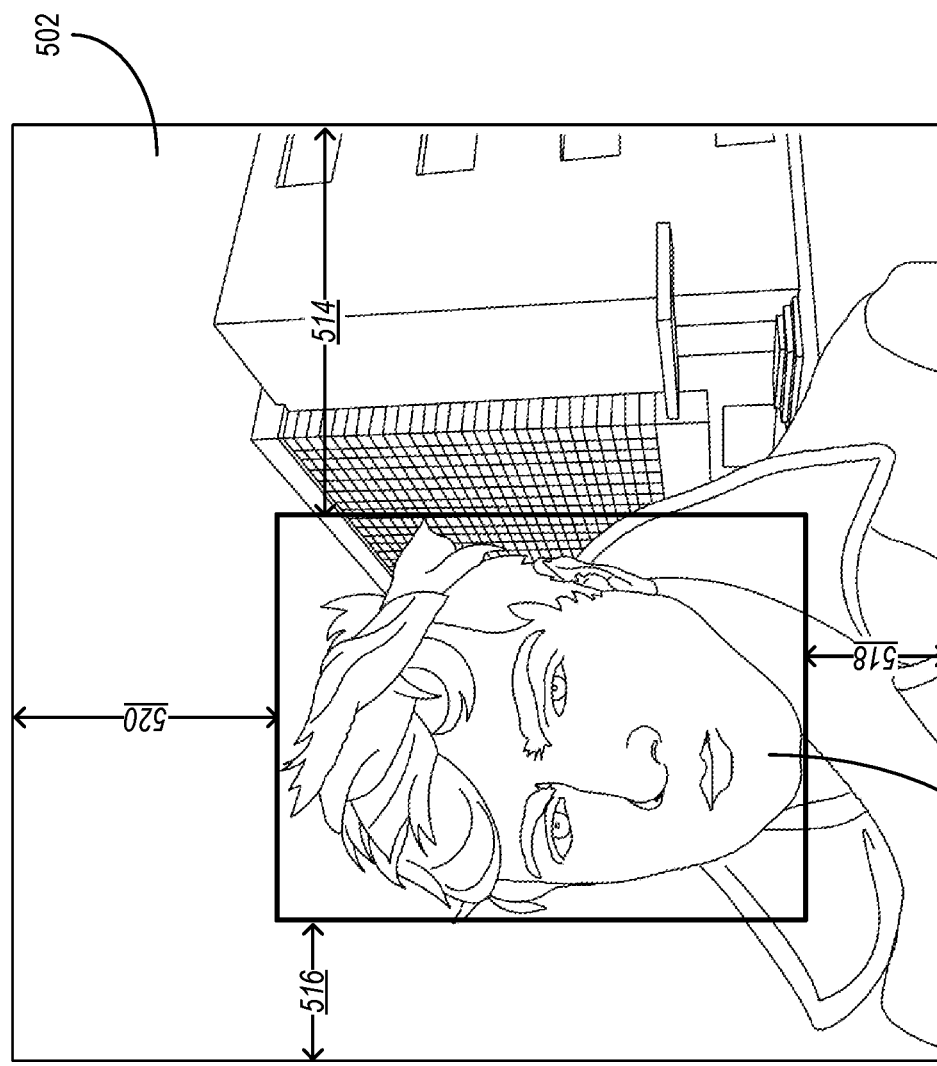
FIG. 6 illustrates an overview of a process of generating a face expandability score for a digital portrait in accordance with one or more implementations.

As mentioned, the digital portrait selection system 102 can also (or alternatively) determine face expandability score for digital portraits. In particular, the digital portrait selection system 102 can determine face expandability scores to help ensure that selected cover photos include an appropriate buffer space around a depicted face and that the depicted face is not cut off at any given side. Indeed, FIG. 6 illustrates an example digital portrait 502 for which the digital portrait selection system 102 determines a face expandability score in accordance with one or more implementations. As shown, the digital portrait selection system 102 determines a face expandability score based on the dimensions of the face 512 depicted within the digital portrait 502 as well as the dimensions of the digital portrait 502 itself.

To elaborate, the digital portrait selection system 102 determines a face expandability score for the digital portrait 502 by determining an amount of expansion space available within the digital portrait 502 for increasing the size of the face 512 until the face 512 touches or exceeds a boundary of the digital portrait 502. Particularly, the digital portrait selection system 102 determines distance (e.g., a number of pixels) that the face 512 can expand in any given direction (e.g., up, down, left, and right) before contacting or extending beyond a boundary of the digital portrait 502.

For example, the digital portrait selection system 102 determines a left expansion distance 516 that indicates a distance (e.g., a number of pixels) that is available between a leftmost position of the face 512 (e.g., the left edge of the determined bounding box) and the left boundary of the digital portrait 502. Similarly, the digital portrait selection system 102 determines a right expansion distance 514 that indicates a distance that is available between a rightmost position of the face 512 (e.g., the right edge of the determined bounding box) and a right boundary of the digital portrait 502. The digital portrait selection system 102 also determines a top expansion distance 520 that indicates a distance between a topmost position of the face 512 (e.g., the top edge of the determined bounding box) and the top boundary of the digital portrait 502. In a similar fashion, the digital portrait selection system 102 determines a bottom expansion distance 518 that indicates a distance between a bottommost position of the face 512 (e.g., the bottom edge of the determined bounding box) and the bottom boundary of the digital portrait 502.

Based on the left expansion distance 516, the right expansion distance 514, the top expansion distance 520, and the bottom expansion distance 518, the digital portrait selection system 102 can also determine respective expansion percentages that indicate percentage increases in size of the face 512 in particular directions. Indeed, the digital portrait selection system 102 can determine a left expansion percentage, a right expansion percentage, a top expansion percentage, and a bottom expansion percentage. In some implementations, the digital portrait selection system 102 determines expansion percentages given by:

max desired expansion=75 max expand percent right=$(1-(nx+nfw))*100.0/nfw$ max expand percent left=$nx*100.0/nfw$ max expand percent bottom=$(1-(ny+nfh))*100.0/nfh$ max expand percent top=$ny*100.0/nfh$ where nx represents a normalized face x-coordinate and ny represents a normalized face y-coordinate such that:

$$nx = \frac{x}{\text{digital portrait width}} \text{ and}$$

$$ny = \frac{y}{\text{digital portrait height}}.$$

As indicated by the above equations, the digital portrait selection system 102 compares the direction-specific expansion distances with a threshold expansion distance. For example, the digital portrait selection system 102 compares left, right, top, and bottom expansion distances with a minimum threshold expansion distance to ensure that a depicted face (e.g., the face 512) is at least the threshold distance away from each of the boundaries of a digital portrait (e.g., the digital portrait 502). In some implementations, the digital portrait selection system 102 compares the direction-specific expansion percentages with a threshold expansion percentage. For instance, as indicated in the above equations, the digital portrait selection system 102 utilizes a set percentage (e.g., 75%) as a max desired expansion. In some cases, however, the digital portrait selection system 102 utilizes a different value for the max desired expansion such as 50%, 80%, 90%, or some other value.

Further, based on determining maximum expansion percentages in each direction, the digital portrait selection system 102 can further determine a face expandability score by combining the left expansion percentage, the right expansion percentage, the top expansion percentage, and the bottom expansion percentage with the maximum expansion percentage. The digital portrait selection system 102 can further determine a ratio between the combination of expansion percentages and the maximum expansion percentage for normalizing the face expandability score. In some embodiments the digital portrait selection system 102 determines the face expandability score as given by:

face expandability score=minimum(2*max expand percent right,2*max expand percent left,2*max expand percent bottom,2*max expand percent top,max desired expansion)/max desired expansion.

In some embodiments, however, the digital portrait selection system 102 determines a face expandability score by combining the left expansion distance, the right expansion distance, the top expansion distance, and the bottom expansion distance with the maximum expansion distance. Additionally, the digital portrait selection system 102 can normalize the combination by determining a ratio between the combination of expansion distance and the maximum expansion distance for the face expandability score.

Additionally, based on determining a face expandability score for the digital portrait 502 as well for other digital portraits (e.g., within the digital portrait collection 204a), the digital portrait selection system 102 can filter out digital portraits from consideration as a cover image. To elaborate, the digital portrait selection system 102 seeks to avoid closeup digital portraits where a face takes up too much space within a digital portrait or where parts of a face may be cut off by boundaries of a digital portrait or where a digital portrait includes little or no background. Thus, the digital portrait selection system 102 compares the face expandability score for the digital portrait 502 with a threshold expandability score to determine whether the face 512 depicted within the digital portrait 502 is proportionately sized for the digital portrait 502 and therefore acceptable for consideration as a cover image. Indeed, if any of the four expansion distances or percentages (e.g., left, right, top, or bottom) are below a threshold, the digital portrait selection system 102 can filter out the digital portrait (or assign a low score). In some implementations, the digital portrait selection system 102 ranks digital portraits according to face expandability scores and selects a top-ranked (e.g., top-expandability-score) digital portrait within a given user-specific collection (e.g., the digital portrait collection 204a) as a cover image.

Figure 7:
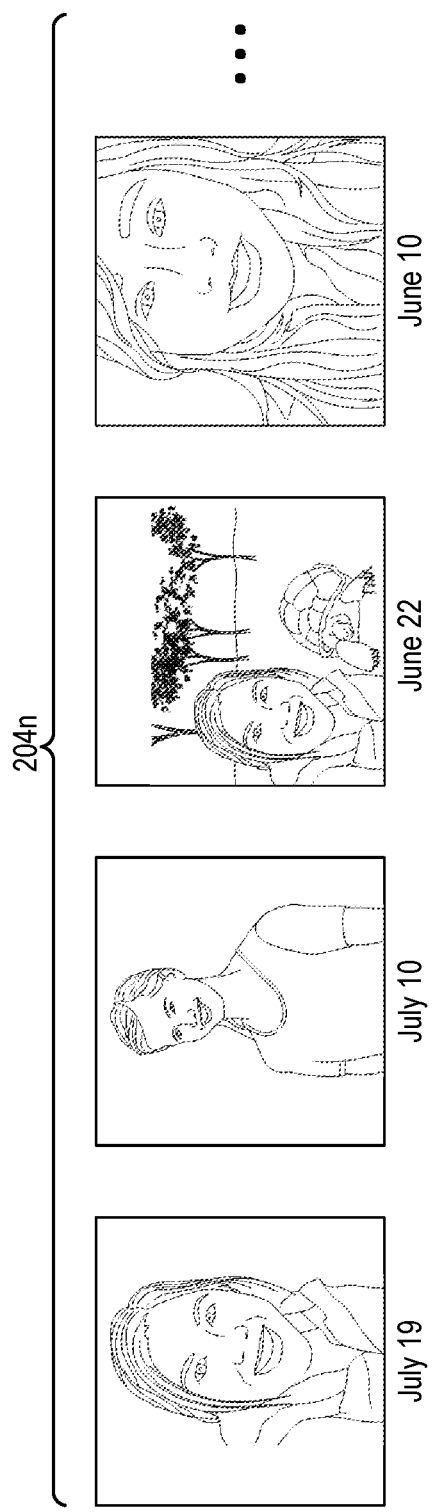
FIG. 7 illustrates an overview of a process of generating a recency score for a digital portrait in accordance with one or more implementations.

As mentioned, the digital portrait selection system 102 can determine recency scores for digital portraits. In particular, the digital portrait selection system 102 can determine recency scores to help ensure that selected cover images are based at least in part on recency and do not become outdated. Indeed, FIG. 7 illustrates an example digital portrait collection 204n that includes digital portraits depicting faces of a user corresponding to capture dates of the respective digital portraits in accordance with one or more implementations. As shown, the digital portrait selection system 102 determines capture dates for the digital portraits and sorts the digital portraits according to capture date (e.g., most recent first, most recent last, or based on user input to selecting a sorting rule). In some implementations, the digital portrait selection system 102 also determines captures times (e.g., time of day) for digital portraits for greater granularity in sorting and/or determining recency scores.

As illustrated in FIG. 7, the digital portrait selection system 102 determines recency scores for the digital portraits within the digital portrait collection 204n based on the number of unique digital portraits and further based on respective capture dates. For example, the digital portrait selection system 102 determines recency scores by generating indices (e.g., integer values) for the plurality of digital portraits according to their respective capture dates and comparing the indices of the plurality of digital portraits with a total number of digital portraits. In some implementations, the digital portrait selection system 102 determines a recency score for a digital portrait in accordance with:

unique digital portraits = digital portraits with distinct capture dates or times sorted digital portraits = digital portraits indexed with respect to capture date recency score =

$$\frac{\text{(index of digital portrait in list of sorted digital portraits)}}{\text{(number of unique capture dates or times)}}.$$

As indicated by the above equations, the digital portrait selection system 102 determines a recency score for a digital portrait based on an index of the digital portrait. Indeed, as mentioned, the digital portrait selection system 102 sorts digital portraits within the digital portrait collection 204n by capture date (and/or capture time) and assigns an index (e.g., an integer representing a relative position of a digital portrait within the sorted digital portrait collection 204n) to each digital portrait. In some implementations, the digital portrait selection system 102 assigns the same index value to digital portraits that share a capture date. Thus, per above, the digital portrait selection system 102 determines a recency score for a digital portrait as a ratio of the index assigned to the digital portrait in relation to the total number of unique capture dates within the digital portrait collection 204n. In some implementations, the digital portrait selection system 102 determines a recency score based on capture times for greater granularity where the indices are assigned by capture time and the denominator term of the recency score refers to the total number of unique capture times.

In addition, the digital portrait selection system 102 updates recency scores for digital portraits. In some implementations, the digital portrait selection system 102 updates recency scores based on detecting or receiving new digital portraits to a collection (e.g., the digital portrait collection 204n). For instance, the digital portrait selection system 102, modifies a recency score for a digital portrait within the digital portrait collection 204n based on receiving a new digital portrait to add to the digital portrait collection 204n. Indeed, the digital portrait selection system 102 re-determines an index for a digital portrait and re-generates a recency score based on modifications to the digital portrait collection 204n. Thus, the digital portrait selection system 102 actively updates the recency scores for digital portraits to maintain accurate, up-to-date recency scores for dynamic digital portrait collections that are constantly being modified as users capture new images.

Figure 8:
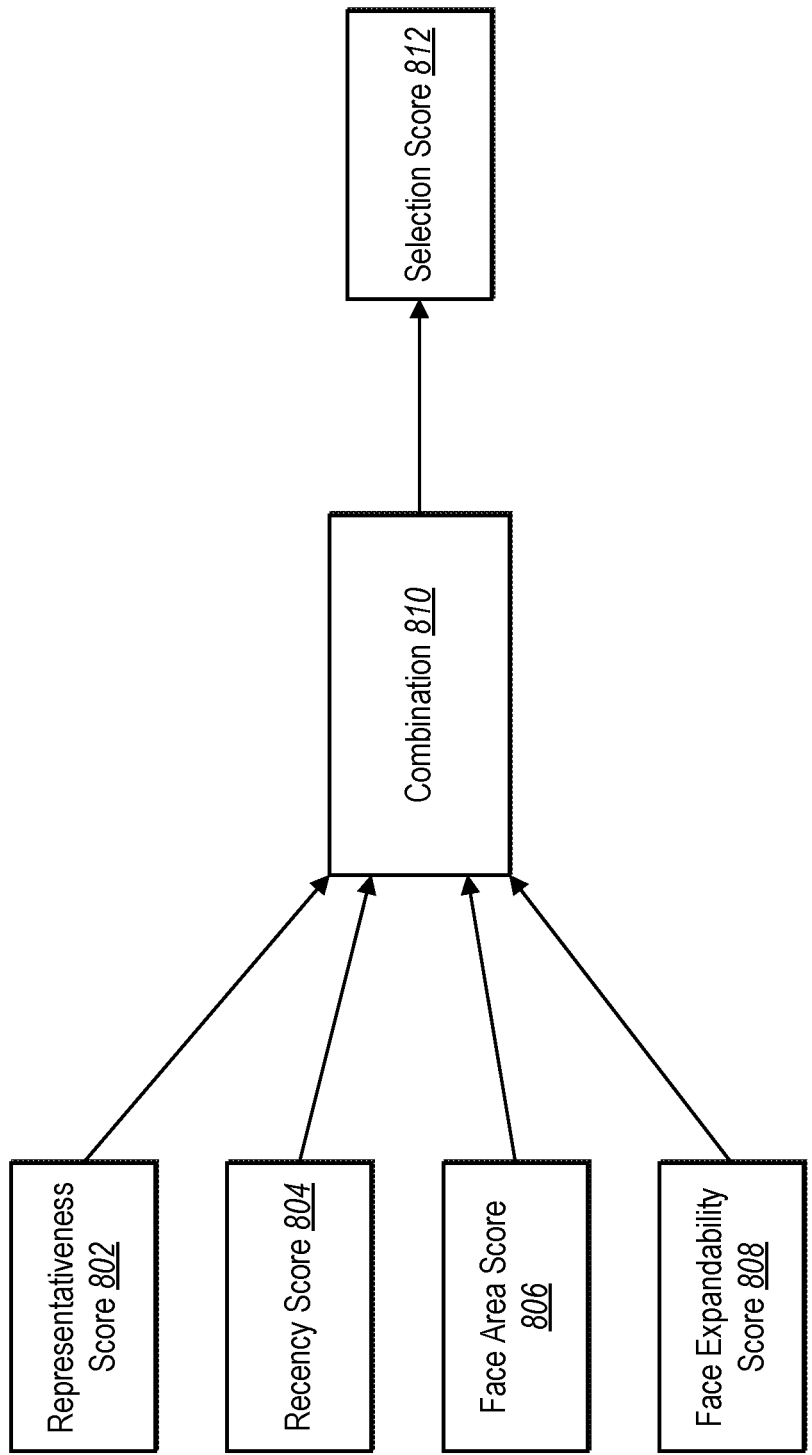
FIG. 8 illustrates an overview of a process of generating a selection score for a digital portrait in accordance with one or more implementations.

As mentioned, the digital portrait selection system 102 can determine selection scores for digital portraits to use for selecting cover images. In particular, the digital portrait selection system 102 can determine selection scores for digital images by combining two or more of their respective representativeness scores, recency scores, face area scores, and/or face expandability scores. In some embodiments, the digital portrait selection system 102 generates a selection score in the form of a weighted combination of a representativeness score, a recency score, a face area score, and/or a face expandability score. FIG. 8 illustrates an example flow depicting how the digital portrait selection system 102 generates a selection score 812 for a given digital portrait (e.g., the digital portrait 502) in accordance with one or more implementations. As shown, the digital portrait selection system 102 determines the selection score 812 based on a combination of one or more other scores.

For instance, the digital portrait selection system 102 determines a selection score based on a combination 810 of a representativeness score 802, a recency score 804, a face area score 806, and/or a face expandability score 808. As illustrated, the digital portrait selection system 102 combines the representativeness score 802, the recency score 804, the face area score 806, and the face expandability score 808 utilizing a weighted combination. Indeed, the digital portrait selection system 102 can determine a representativeness weight to apply to the representativeness score 802, a recency weight to apply to the recency score 804, a face area weight to apply to the face area score 806, and a face expandability weight to apply to the face expandability score 808.

In some implementations, the digital portrait selection system 102 determines the selection score 812 by first filtering out any digital portraits with a given score (representativeness score 802, the recency score 804, the face area score 806, or the face expandability score 808) below a corresponding threshold. For example, the digital portrait selection system 102 can select digital portraits that meet the following criteria (and filter the digital portraits that do not meet any of the following criteria):

representativeness score≥representativeness score threshold
face area score≥face area threshold
face expandability score≥min desired expansion/max desired expansion where
representativeness score threshold=0.65
face area threshold=0.008
min desired expansion=50.0 and
max desired expansion=75.0.

After having filtered out lesser quality digital portraits using the above thresholds, the digital portrait selection system 102 can generate a selection score using the following algorithm:

selection score=representativeness score*representativeness weight+face area score*face area weight+face expandability score*face expandability weight+recency score*recency weight where
representativeness weight=0.35
face area weight=0.25
face expandability weight=0.25
capture date weight=0.15.

In other words, the digital portrait selection system 102 determines the selection score 812 for a given digital portrait by multiplying the given score (representativeness score 802, the recency score 804, the face area score 806, or the face expandability score 808) by a corresponding weight and summing the weighted scores.

In one or more implementations, the digital portrait selection system 102 determines the representativeness weight, the face area weight, the face expandability weight, and/or the capture date weight. For example, the digital portrait selection system 102 determines different values for one or more of the weights. To determine the weights, the digital portrait selection system 102 can perform a number of experiments to fine tune weight values that yield good results for selecting representative, recent cover images. In some implementations, the digital portrait selection system 102 receives user input to define one or more weights based on user preferences. In one or more implementations the digital portrait selection system 102 sets the representativeness weight higher than the other weights. This can help ensure that any digital portrait selected as a cover photo will accurately represent the content of the digital portraits in the collection.

In these or other implementations, the digital portrait selection system 102 re-determines or modifies selection scores based on detecting or receiving additional digital portraits to a digital portrait collection (e.g., the digital portrait collection 204a or 204n). In particular, the digital portrait selection system 102 detects new digital portraits uploaded by a user and re-determines one or more of the representativeness scores, the recency score, the face area scores, or the face expandability scores for digital portraits within the modified digital portrait collection. Thus, the digital portrait selection system 102 further re-determines selection scores based on identifying modified representativeness scores, recency scores, face area scores, and/or face expandability scores. In this manner, the digital portrait selection system 102 determines up-to-date, accurate selection scores for digital portraits.

Based on determining selection scores for digital portraits within a digital portrait collection (e.g., the digital portrait collection 204a or 204n), the digital portrait selection system 102 selects a cover image for a user. For example, the digital portrait selection system 102 selects a digital portrait with a highest selection score from among a digital image collection as a cover image. In some implementations, the digital portrait selection system 102 selects a top number (e.g., 3) of digital portraits with top selection scores as candidates to present to a user, whereupon the user can provide input to select a cover image from the candidates.

Figure 9:
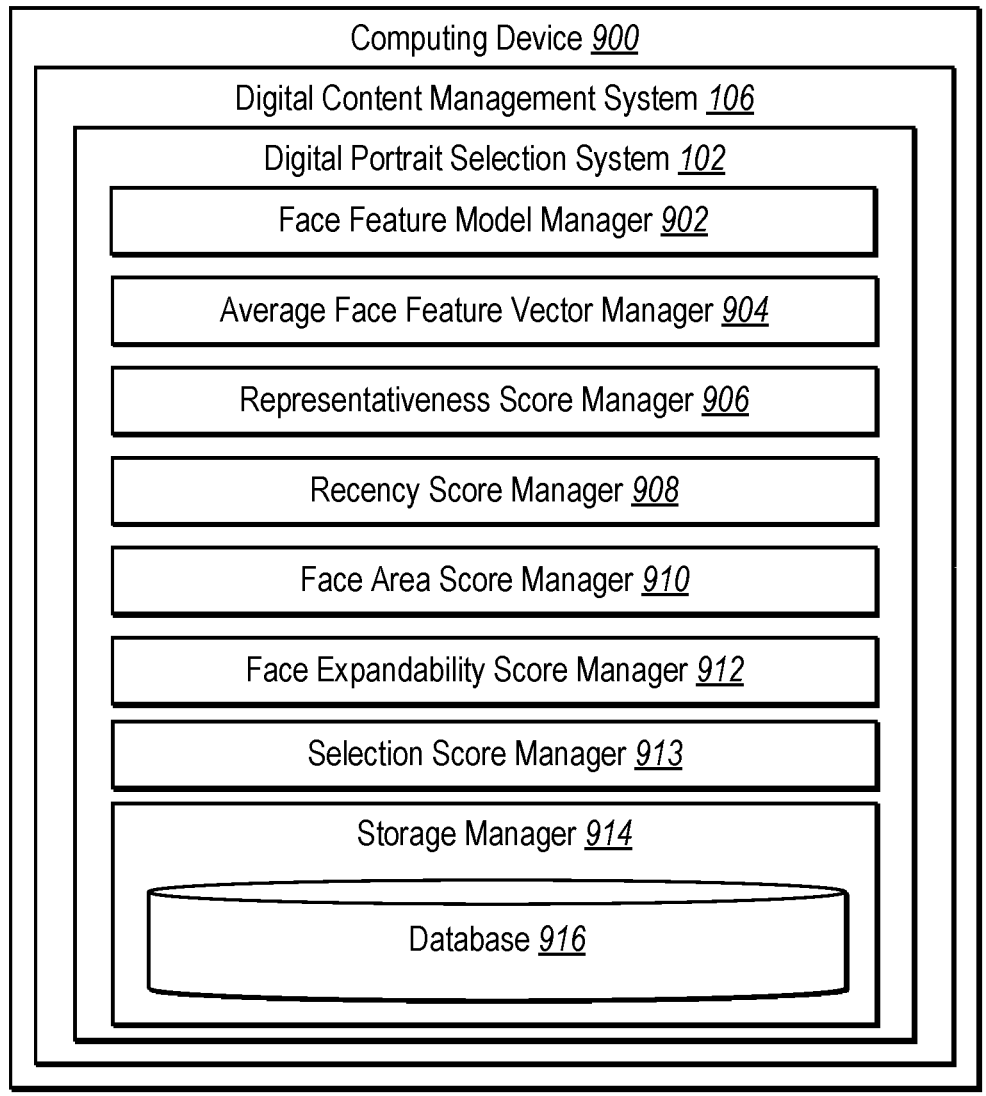
FIG. 9 illustrates a schematic diagram of a digital portrait selection system in accordance with one or more implementations.

Referring now to FIG. 9, additional detail will be provided regarding components and capabilities of the digital portrait selection system 102. Specifically, FIG. 9 illustrates an example schematic diagram of the digital portrait selection system 102 on an example computing device 900 (e.g., one or more of the client devices 110a-110n and/or the server(s) 104). As shown in FIG. 9, the digital portrait selection system 102 may include a face feature model manager 902, an average face feature vector manager 904, a representativeness score manager 906, a recency score manager 908, a face area score manager 910, a face expandability score manager 912, a selection score manager 913, and a storage manager 914.

As just mentioned, the digital portrait selection system 102 includes a face feature model manager 902. In particular, the face feature model manager 902 can manage, maintain, implement, apply, or utilize a face feature model (e.g., the face feature model 304) to determine or generate feature vectors for digital portraits. For example, the face feature model manager 902 generates feature vectors that represent visible features and/or unobservable deep features of digital portraits. In one or more implementations, the average face feature vector manager 904 can comprise a neural network, such as that described in U.S. Pat. No. 9,613,058. In addition, the face feature model manager 902 communicates with the average face feature vector manager 904 to provide feature vectors for generating an average face feature vectors. In some implementations, the face feature model manager 902 communicates with the storage manager 914 to access digital portraits from, and to store feature vectors within, the database 916 (e.g., the database 202).

As shown in FIG. 9, the digital portrait selection system 102 includes an average face feature vector manager 904 that can manage, maintain, generate, or determine an average face feature vector for a given user. Indeed, the average face feature vector manager 904 analyzes feature vectors for digital portraits within a digital portrait collection (e.g., the digital portrait collection 204a or 204n) to generate an average face feature vector based on averaging feature values across digital portraits. In some implementations, the average face feature vector manager 904 communicates with the representativeness score manager 906 to determine representativeness scores. In these or other implementations, the average face feature vector manager 904 communicates with the storage manager 914 to store average face vectors within the database 916.

As shown, the digital portrait selection system 102 also includes a representativeness score manager 906. In particular, the representativeness score manager 906 can manage, determine, or generate representativeness scores for digital portraits by comparing face feature vectors with an average face feature vector, as described herein. In addition, the representativeness score manager 906 communicates with the selection score manager 913 to determine a selection score for a digital portrait.

As further shown, the digital portrait selection system 102 includes a recency score manager 908. In particular, the recency score manager 908 can manage, determine, or generate recency scores for digital portraits based on capture dates or capture times, as described herein. In addition, the recency score manager 908 communicates with the selection score manager 913 to determine a selection score for a digital portrait.

Further, the digital portrait selection system 102 includes a face area score manager 910. In particular, the face area score manager 910 can manage, determine, or generate face area scores for digital portraits. For example, the face area score manager 910 determines a face area score for a digital portrait based at least in part on an area of a face depicted within a digital portrait, as described above. In addition, the face area score manager 910 communicates with the selection score manager 913 to determine selection scores based on face area scores.

As further illustrated in FIG. 9, the digital portrait selection system 102 includes a face expandability score manager 912. In particular, the face expandability score manager 912 can manage, determine, or generate a face expandability score for a digital portrait. For example, the face expandability score manager 912 determines a face expandability score based on a size and/or position of a face depicted within a digital portrait, as described above. In addition, the face expandability score manager 912 communicates with the selection score manager 913 to determine selection scores based at least in part on face expandability scores.

Additionally, the digital portrait selection system 102 includes a selection score manager 913. In particular the selection score manager 913 can manage, determine, or generate selections score for digital portraits. For example, the selection score manager 913 generates selection scores based on a combination of one or more of a representativeness score, a recency score, a face area score, and/or a face expandability score. In some implementations, the selection score manager 913 determines weights such as a representativeness weight, a recency weight, a face area weight, and a face expandability weight for determining a weighted combination selection score. In these or other implementations, the digital portrait selection system 102 determines the representativeness weight to be the largest weight to place the most emphasis on identifying representative digital portraits. Further, the selection score manager 913 selects a digital portrait as a cover image based on determined selection scores (e.g., by selecting a digital portrait corresponding to a highest selection score).

In one or more implementations, each of the components of the digital portrait selection system 102 are in communication with one another using any suitable communication technologies. Additionally, the components of the digital portrait selection system 102 can be in communication with one or more other devices including one or more user devices described above. It will be recognized that although the components of the digital portrait selection system 102 are shown to be separate in FIG. 9, any of the subcomponents may be combined into fewer components, such as into a single component, or divided into more components as may serve a particular implementation. Furthermore, although the components of FIG. 9 are described in connection with the digital portrait selection system 102, at least some of the components for performing operations in conjunction with the digital portrait selection system 102 described herein may be implemented on other devices within the environment.

The components of the digital portrait selection system 102 can include software, hardware, or both. For example, the components of the digital portrait selection system 102 can include one or more instructions stored on a computer-readable storage medium and executable by processors of one or more computing devices (e.g., the computing device 900). When executed by the one or more processors, the computer-executable instructions of the digital portrait selection system 102 can cause the computing device 900 to perform the methods described herein. Alternatively, the components of the digital portrait selection system 102 can comprise hardware, such as a special purpose processing device to perform a certain function or group of functions. Additionally or alternatively, the components of the digital portrait selection system 102 can include a combination of computer-executable instructions and hardware.

Furthermore, the components of the digital portrait selection system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital portrait selection system 102 may be implemented as part of a stand-alone application on a personal computing device or a mobile device. Alternatively or additionally, the components of the digital portrait selection system 102 may be implemented in any application that allows creation and delivery of marketing content to users, including, but not limited to, applications in ADOBE CREATIVE CLOUD, such as ADOBE ILLUSTRATOR, ADOBE PHOTOSHOP, ADOBE PREMIERE, ADOBE RUSH, and ADOBE LIGHTROOM. "ADOBE," "ADOBE ILLUSTRATOR," "ADOBE PHOTOSHOP," "ADOBE PREMIERE," "ADOBE RUSH," and "ADOBE LIGHTROOM" are trademarks of Adobe Inc. in the United States and/or other countries.

FIGS. 1-9, the corresponding text, and the examples provide a number of different systems, methods, and non-transitory computer readable media for selecting representative recent digital portraits as cover images. In addition to the foregoing, implementations can also be described in terms of flowcharts comprising acts for accomplishing a particular result. For example, FIG. 10 illustrates a flowchart of an example sequence of acts in accordance with one or more implementations.

Figure 10:
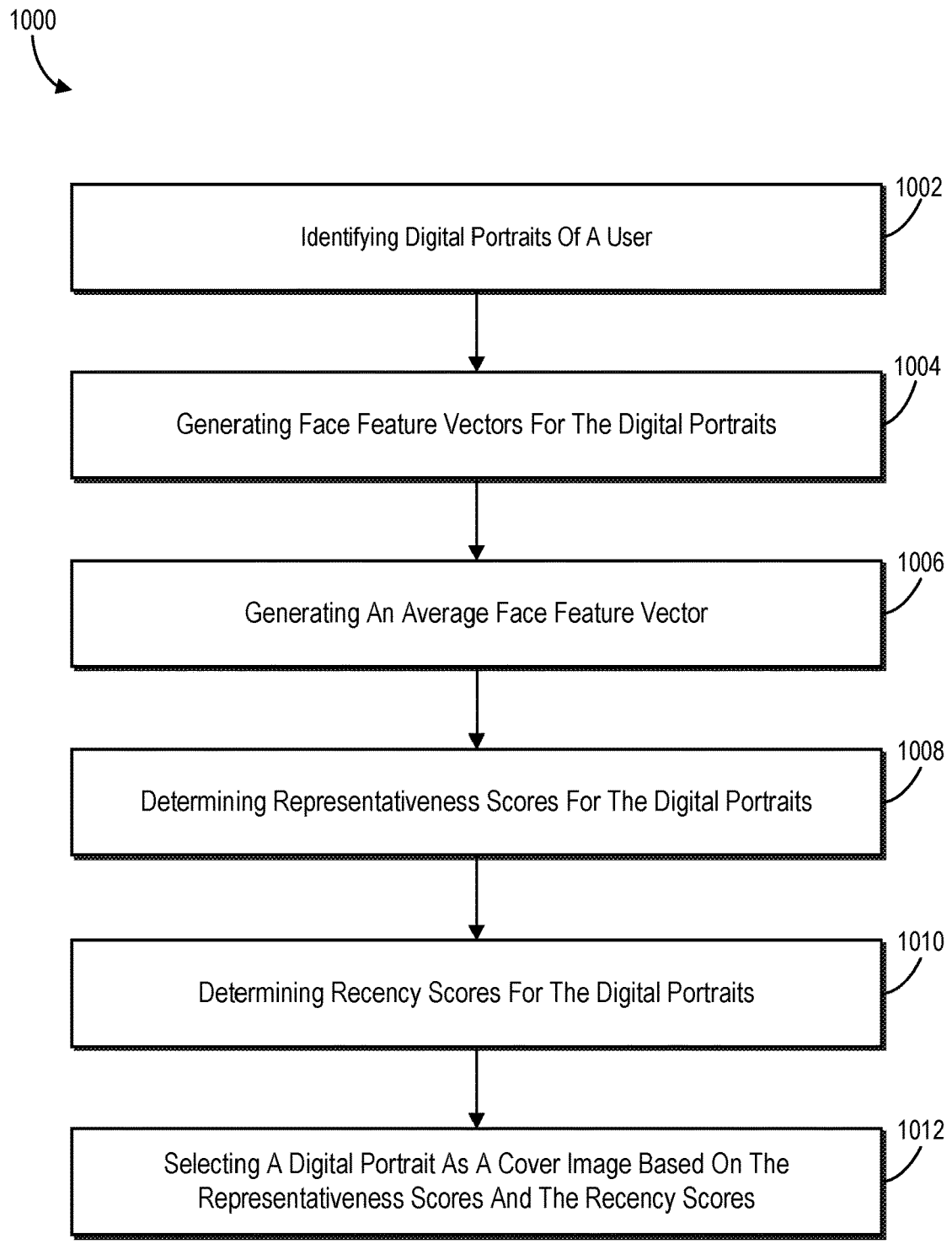
FIG. 10 illustrates a flowchart of a series of acts for selecting a cover image based on determining representativeness scores and recency scores in accordance with one or more implementations.

While FIG. 10 illustrates acts according to one embodiment, alternative implementations may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further implementations, a system can perform the acts of FIG. 10. Additionally, the acts described herein may be repeated or performed in parallel with one another or in parallel with different instances of the same or other similar acts.

FIG. 10 illustrates an example series of acts 1000 for selecting representative recent digital portraits as cover images based on selection scores. The series of acts 1000 includes an act 1002 of identifying digital portraits of a user. In particular, the act 1002 can involve identifying a plurality of digital portraits that depict faces of a user.

In addition, the series of acts 1000 includes an act 1004 of generating feature vectors for the digital portraits. In particular, the act 1004 can involve generating face feature vectors for the plurality of digital portraits utilizing a face feature model. In one or more implementations, the act 1004 can involve generating face feature vectors for the plurality of digital portraits by extracting deep features from the plurality of digital portraits utilizing a neural network.

As shown, the series of acts 1000 includes an act 1006 of generating an average face feature vector. In particular, the act 1006 can involve generating, based on the face feature vectors, an average face feature vector that represents a combination of the face feature vectors of the plurality of digital portraits. The act 1006 can involve determining average feature values for respective features of the face feature vectors of the plurality of digital portraits. In some implementations, the act 1006 an involve determining, for a first feature included in two or more of the face feature vectors, a first average feature value, determining, for a second feature included in two or more of the face feature vectors, a second average feature value, and including the first average feature value and the second average feature value within the average face feature vector. In some implementations, the average face feature vector can include a face feature vector that represents a most common facial expression depicted within the plurality of digital portraits.

Further, the series of acts 1000 includes an act 1008 of determining representativeness scores for the digital portraits. In particular, the act 1008 can involve determining representativeness scores for the plurality of digital portraits representativeness score by determining a measure of closeness of a face feature vector of a respective digital portrait to the average face feature vector. In some implementations, the act 1008 involves determining distances between the face feature vectors associated with the plurality of digital portraits and the average face feature vector within a vector space. In the same or other implementations, the act 1008 can involve determining representativeness scores for the plurality of digital portraits based on distances between the face feature vectors and the average face feature vector within a vector space, determining recency scores for the plurality of digital portraits based on comparing capture dates of the plurality of digital portraits, and generating weighted combinations for the plurality of digital portraits based on the representativeness scores and the recency scores. The act 1008 can involve generating the weighted combination for the plurality of digital portraits further based on the face area scores. The act 1008 can involve generating the weighted combination for the plurality of digital portraits further based on the face expandability scores.

As further illustrated, the series of acts 1000 includes an act 1010 of determining recency scores for the digital portraits. In particular, the act 1010 can involve determining recency scores for the plurality of digital portraits, wherein a recency score is based at least in part on a date and/or time that a corresponding digital portrait was captured (e.g., a capture date). The act 1010 can involve generating indices for the plurality of digital portraits according to their respective capture dates and comparing the indices of the plurality of digital portraits with a total number of digital portraits. The act 1010 can involve indexing the plurality of digital portraits according to capture date and generating respective ratios of indices of digital portraits to a total number of digital portraits in the plurality of digital portraits.

Additionally, the series of acts 1000 includes an act 1012 of selecting a digital portrait as a cover image. In particular, the act 1012 can involve selecting a digital portrait of the plurality of digital portraits as a cover image for the user based on the representativeness scores and the recency scores. The act 1012 can involve determining selection scores for the plurality of digital portraits by generating weighted combinations of the representativeness scores and recency scores and selecting the digital portrait from among the plurality of digital portraits based on the selection scores. A cover image can include a digital portrait that satisfies both a similarity threshold in relation to the average face feature vector and a recency threshold. The act 1012 can involve selecting the digital portrait of the plurality of digital portraits as the cover image further based on the face area scores. The act 1012 can involve selecting the digital portrait of the plurality of digital portraits as the cover image further based on the face expandability scores. The act 1012 can involve selecting the digital portrait of the plurality of digital portraits as the cover image further based on the recency scores.

The series of acts 1000 can also include an act of determine face area scores for the plurality of digital portraits based on a normalized face width and a normalized face height. Determining face area scores can involve determining areas within the plurality of digital portraits covered by faces.

Additionally (or alternatively), the series of acts 100 can include an act of determining face expandability scores for the plurality of digital portraits by determining a measure of space available to expand a face. Determining a face expandability score can involve determining, for the given digital portrait, a measure of space available to expand a face depicted within the given digital portrait before exceeding a boundary of the given digital portrait. Determining a face expandability score can further involve comparing the measure of space available within the given digital portrait to expand the face to a threshold expansion space.

In some implementations, determining face expandability scores can involve determining, for a given digital portrait, a left expansion distance from a leftmost position of the face depicted within the given digital portrait and a left boundary of the given digital portrait, a right expansion distance from a rightmost position of the face depicted within the given digital portrait and a right boundary of the given digital portrait, a top expansion distance from a topmost position of the face depicted within the given digital portrait and a top boundary of the given digital portrait, and a bottom expansion distance from a bottommost position of the face depicted within the given digital portrait and a bottom boundary of the given digital portrait. In these or other implementations, determining a face expandability score for a given digital portrait can involve comparing the left expansion distance, the right expansion distance, the top expansion distance, and the bottom expansion distance to a threshold expansion distance.

The series of acts 1000 can include an act of determining selection scores for the plurality of digital portraits. For example, determining selection scores can involve generating weighted combinations based on the representativeness scores, the recency score, the face area scores, and the face expandability scores for the plurality of digital portraits. Generating the weighted combinations can involve applying a representativeness weight to the representativeness scores, a recency weight to the recency scores, a face area weight to the face area scores, and a face expandability weight to the face expandability scores. In some implementations, the representativeness weight is larger than the recency weight, the face area weight, and the face expandability weight.

Figure 11:
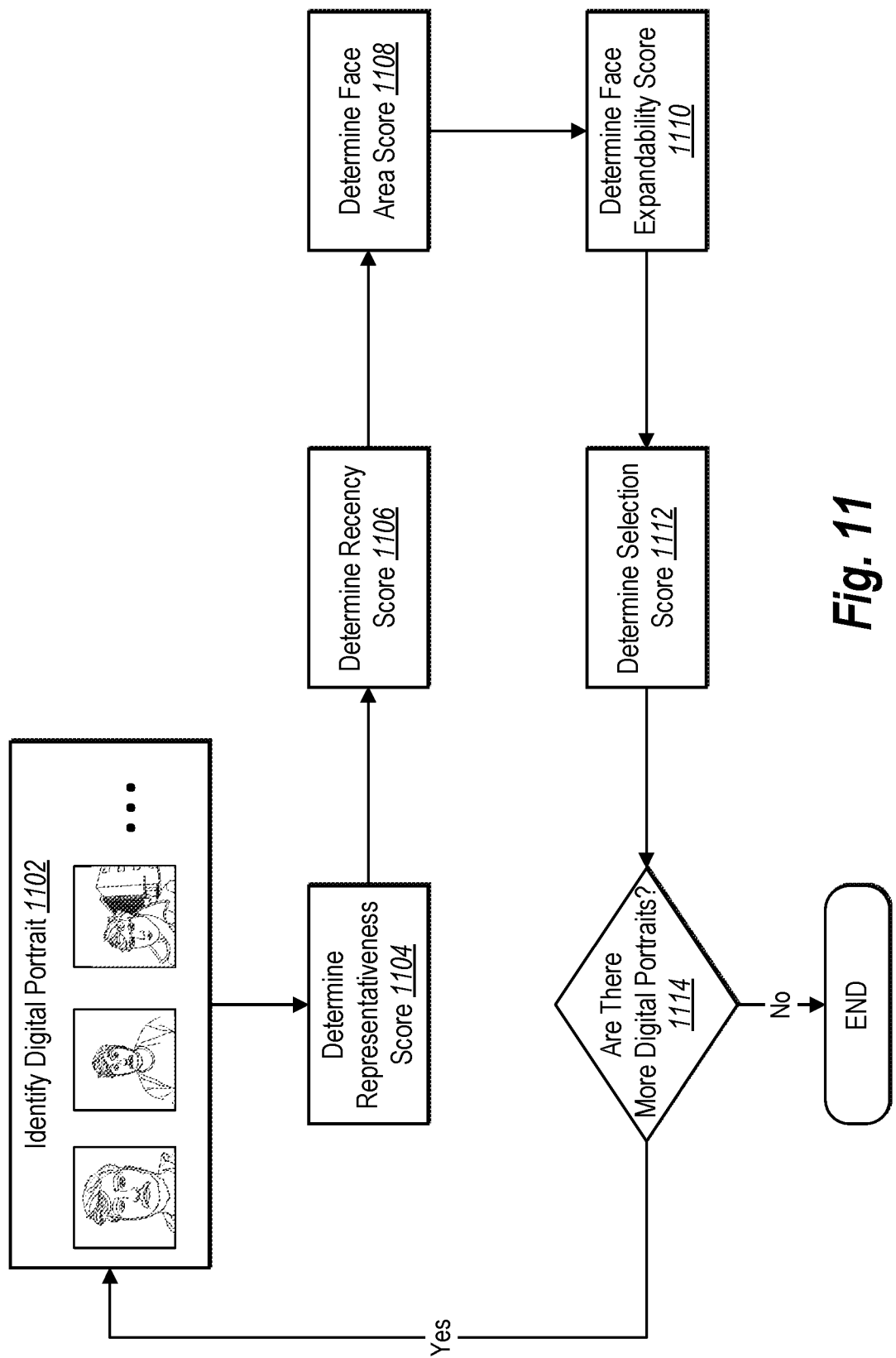
FIG. 11 illustrates a series of acts of a step for determining selection scores for the plurality of digital portraits to identify a representative recent digital portrait in accordance with one or more implementations.

As mentioned, the digital portrait selection system 102 can perform a step for determining selection scores for the plurality of digital portraits to identify a representative recent digital portrait. In particular, FIG. 11 illustrates an example series of acts 1102-1114 involved in a step for determining selection scores for the plurality of digital portraits to identify a representative recent digital portrait in accordance with one or more implementations.

As illustrated, the digital portrait selection system 102 the digital portrait selection system 102 performs an act 1102 to identify a digital portrait. In particular, the digital portrait selection system 102 identifies a digital portrait from within a digital portrait collection.

As shown, the digital portrait selection system 102 performs an act 1104 to determine a representativeness score for the identified digital portrait. In particular, the digital portrait selection system 102 generates a face feature vector for the digital portrait and compares the face feature vector of the digital portrait with an average face feature vector generated for the digital images in the digital portrait collection portraying the user. As described above, the digital portrait selection system 102 determines a representativeness score that indicates a measure of closeness of a digital portrait to a most common or an average look, appearance, or facial expression of a user.

Additionally, the digital portrait selection system 102 performs an act 1106 to determine a recency score. In particular, the digital portrait selection system 102 determines a recency score as described above by determining capture dates associated with digital portraits within a digital portrait collection, indexing the identified digital portraits based on the capture dates, and ranking the digital portraits based on the indexing and the overall number of digital portraits in the collection.

As further shown, the digital portrait selection system 102 performs an act 1108 to determine a face area score. In particular, the digital portrait selection system 102 determines a face area score by determining an area of a face identified within a digital portrait and comparing the face area with a total digital portrait area, as described above.

Further, the digital portrait selection system 102 performs an act 1110 to determine a face expandability score. In particular, the digital portrait selection system 102 determines a face expandability score based on determining an amount or distance of space available to expand an identified face within a digital portrait until the face hits or exceeds a boundary, as described above.

As illustrated, the digital portrait selection system 102 performs an act 1112 to determine a selection score for an identified digital portrait. In particular, the digital portrait selection system 102 determines a selection score by combining one or more of the representativeness score, the recency score, the face area score, and/or the face expandability score. Indeed, as described above, the digital portrait selection system 102 generates a weighted combination of scores to determine a selection score.

As further illustrated, the digital portrait selection system 102 performs an act 1114 to determine whether there are more digital portraits left to analyze within a given digital portrait collection. Upon determining that there are more digital portraits un processed, the digital portrait selection system 102 repeats the acts 1102-1114 to continue determining selection scores until each digital portrait within the collection has a selection score. In one or more implementations, the acts of FIG. 11 can be in a different order. For example, the acts 1104, 1106, 1108, and 1110 can be performed in any particular order relative to one another.

Upon determining that there are no more digital portraits left for which to determine selection scores, the digital portrait selection system 102 ends the step for determining selection scores for the plurality of digital portraits to identify a representative recent digital portrait and proceeds to select a cover image from the digital portraits that has the highest selection score.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
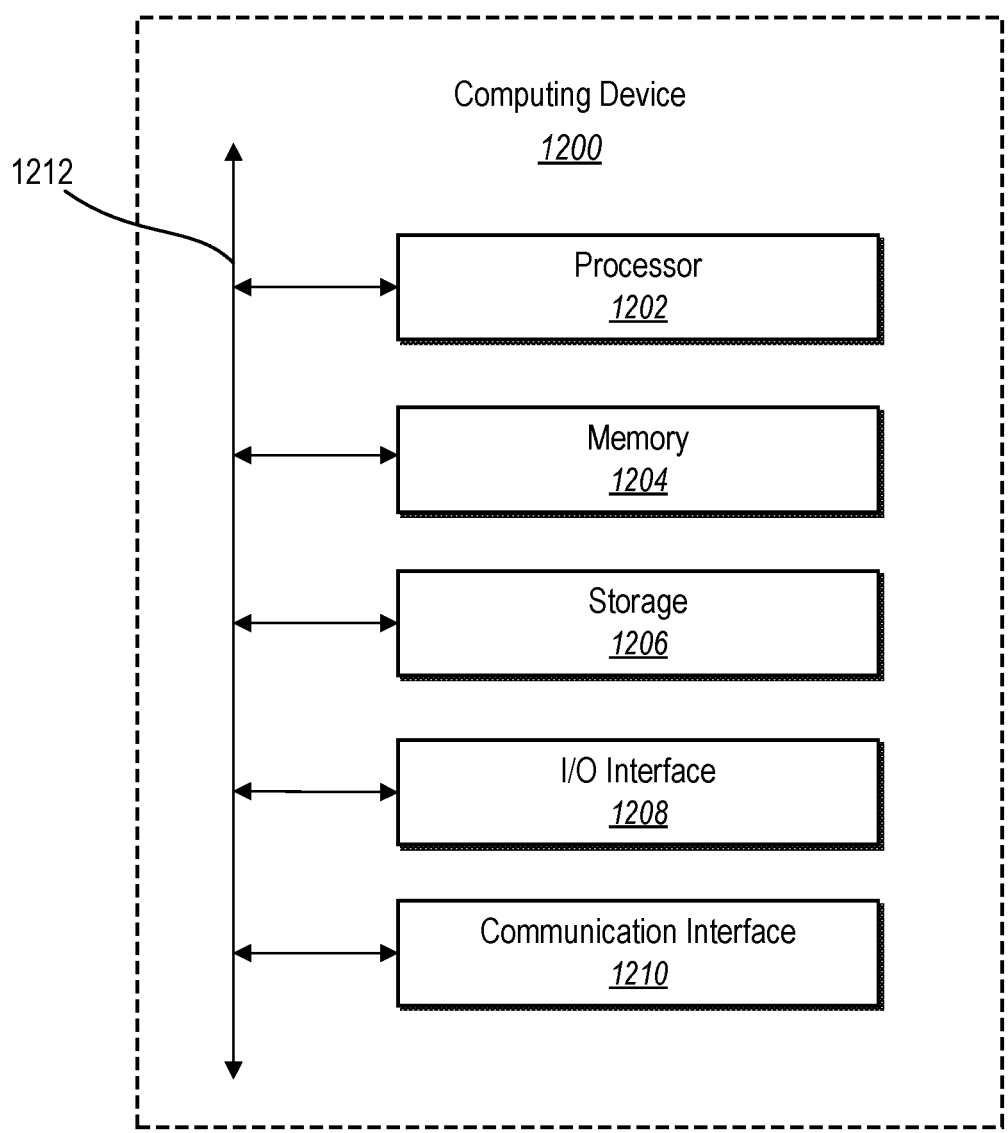
FIG. 12 illustrates a block diagram of an example computing device in accordance with one or more implementations.

FIG. 12 illustrates, in block diagram form, an example computing device 1200 (e.g., the computing device 900, the client devices 110a-110n, and/or the server(s) 104) that may be configured to perform one or more of the processes described above. One will appreciate that the digital portrait selection system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain implementations, the computing device 1200 can include fewer or more components than those shown in FIG. 12. Components of computing device 1200 shown in FIG. 12 will now be described in additional detail.

In particular implementations, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer device to:
   identify a plurality of digital portraits that depict faces of a user;
   generate face feature vectors for the plurality of digital portraits utilizing a neural network to extract deep features for the plurality of digital portraits;
   generate, based on the face feature vectors, an average face feature vector that represents a combination of the face feature vectors of the plurality of digital portraits;
   determine selection scores for the plurality of digital portraits by:
      determining representativeness scores for the plurality of digital portraits based on distances between the face feature vectors and the average face feature vector within a vector space;
      determining recency scores for the plurality of digital portraits based on comparing capture dates of the plurality of digital portraits; and
      generating weighted combinations for the plurality of digital portraits based on the representativeness scores and the recency scores; and
   select a digital portrait of the plurality of digital portraits as a cover image based on the selection scores.

2. The non-transitory computer readable medium of claim 1, further comprising instructions that, when executed by the at least one processor, cause the computer device to:
   determine face area scores for the plurality of digital portraits based on a normalized face width and a normalized face height; and
   select the digital portrait of the plurality of digital portraits as the cover image further based on the face area scores.

3. The non-transitory computer readable medium of claim 1, further comprising instructions that, when executed by the at least one processor, cause the computer device to:

determine face expandability scores for the plurality of digital portraits by determining space available to expand a face depicted within digital portraits before exceeding a boundary of the digital portraits; and
select the digital portrait of the plurality of digital portraits as the cover image further based on the face expandability scores.

4. The non-transitory computer readable medium of claim 1, further comprising instructions that, when executed by the at least one processor, cause the computer device to:
receive one or more additional digital portraits depicting faces of the user; and
in response to receiving the one or more additional digital portraits, automatically update the selection scores and select an updated cover image based on the updated selection scores.

5. The non-transitory computer readable medium of claim 1, further comprising instructions that, when executed by the at least one processor, cause the computer device to determine the recency scores for the plurality of digital portraits by:
generating indices for the plurality of digital portraits according to their respective capture dates; and
comparing the indices of the plurality of digital portraits with a total number of digital portraits.

6. The non-transitory computer readable medium of claim 1, wherein generating the weighted combinations comprises assigning a first weight to the representativeness scores and assigning a second weight to the recency scores.

7. The non-transitory computer readable medium of claim 1, further comprising instructions that, when executed by the at least one processor, cause the computer device to generate the average face feature vector by:
determining, for a first feature included in two or more of the face feature vectors, a first average feature value;
determining, for a second feature included in two or more of the face feature vectors, a second average feature value; and
including the first average feature value and the second average feature value within the average face feature vector.

8. The non-transitory computer readable medium of claim 1, further comprising instructions that, when executed by the at least one processor, cause the computer device to determine the representativeness scores by determining measures of closeness of face feature vectors corresponding the plurality of digital portraits to the average face feature vector.

9. A system comprising:
one or more memory devices comprising digital portraits corresponding to users; and
one or more server devices that cause the system to:
identify a plurality of digital portraits that depict faces of a user;
generate face feature vectors for the plurality of digital portraits utilizing a neural network to extract deep features for the plurality of digital portraits;
generate, based on the face feature vectors, an average face feature vector that represents a combination of the face feature vectors of the plurality of digital portraits;
determine selection scores for the plurality of digital portraits by:
determining representativeness scores for the plurality of digital portraits based on distances between the face feature vectors and the average face feature vector within a vector space;
determining recency scores for the plurality of digital portraits based on comparing capture dates of the plurality of digital portraits; and
generating weighted combinations for the plurality of digital portraits based on the representativeness scores and the recency scores; and
select a digital portrait of the plurality of digital portraits as a cover image based on the selection scores.

10. The system of claim 9, wherein the one or more server devices further cause the system to determine face area scores for the plurality of digital portraits by determining areas within the plurality of digital portraits covered by faces.

11. The system of claim 10, wherein the one or more server devices further cause the system to determine face expandability scores for the plurality of digital portraits by determining, for a given digital portrait:
a left expansion distance from a leftmost position of the face depicted within the given digital portrait and a left boundary of the given digital portrait;
a right expansion distance from a rightmost position of the face depicted within the given digital portrait and a right boundary of the given digital portrait;
a top expansion distance from a topmost position of the face depicted within the given digital portrait and a top boundary of the given digital portrait; and
a bottom expansion distance from a bottommost position of the face depicted within the given digital portrait and a bottom boundary of the given digital portrait.

12. The system of claim 11, wherein the one or more server devices cause the system to determine the face expandability score for the given digital portrait by further comparing the left expansion distance, the right expansion distance, the top expansion distance, and the bottom expansion distance to a threshold expansion distance.

13. The system of claim 12, wherein the one or more server devices cause the system to determine the selection scores by further generating weighted combinations based on the representativeness scores, the recency score, the face area scores, and the face expandability scores for the plurality of digital portraits.

14. The system of claim 12, wherein the one or more server devices cause the system to generate the weighted combinations by applying a representativeness weight to the representativeness scores, a recency weight to the recency scores, a face area weight to the face area scores, and a face expandability weight to the face expandability scores.

15. The system of claim 14, wherein the representativeness weight is larger than the recency weight, the face area weight, and the face expandability weight.

16. The system of claim 9, wherein the one or more server devices further cause the system to determine the recency scores for the plurality of digital portraits by:
indexing the plurality of digital portraits according to capture date; and
generating respective ratios of indices of digital portraits to a total number of digital portraits in the plurality of digital portraits.

17. A method comprising:
identifying a plurality of digital portraits that depict faces of a user;
generating face feature vectors for the plurality of digital portraits utilizing a neural network to extract deep features for the plurality of digital portraits;
generating, based on the face feature vectors, an average face feature vector that represents a combination of the face feature vectors of the plurality of digital portraits;

determining selection scores for the plurality of digital portraits by:
    determining representativeness scores for the plurality of digital portraits based on distances between the face feature vectors and the average face feature vector within a vector space;
    determining recency scores for the plurality of digital portraits based on comparing capture dates of the plurality of digital portraits; and
    generating weighted combinations for the plurality of digital portraits based on the representativeness scores and the recency scores; and
selecting a digital portrait of the plurality of digital portraits as a cover image based on the selection scores.

18. The method of claim 17, wherein generating the average face feature vector comprises determining average feature values for respective features of the face feature vectors of the plurality of digital portraits.

19. The method of claim 17, wherein selecting the cover image comprises identifying a digital portrait that satisfies both a similarity threshold in relation to the average face feature vector and a recency threshold.

20. The method of claim 17, wherein generating the average face feature vector comprises generating a face feature vector that represents a most common facial expression depicted within the plurality of digital portraits.

* * * * *